United States Patent
Lee et al.

(10) Patent No.: US 11,728,682 B2
(45) Date of Patent: Aug. 15, 2023

(54) WIRELESS POWER TRANSMISSION/RECEPTION DEVICE AND METHOD OF OPERATING THE SAME

(71) Applicant: Samsung Electronics Co., Ltd., Suwon-si (KR)

(72) Inventors: Jinhoo Lee, Suwon-si (KR); Wonkyu Sung, Suwon-si (KR); Jungwon Lee, Suwon-si (KR); Daehyeong Park, Suwon-si (KR); Yonghwa Han, Suwon-si (KR); Minwoo Yoo, Suwon-si (KR); Hyoungwook Yi, Suwon-si (KR); Jongchul Choi, Suwon-si (KR); Changryong Heo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 279 days.

(21) Appl. No.: 17/033,334

(22) Filed: Sep. 25, 2020

(65) Prior Publication Data

US 2021/0099019 A1 Apr. 1, 2021

(30) Foreign Application Priority Data

Sep. 27, 2019 (KR) .................. 10-2019-0119948

(51) Int. Cl.
*H02J 50/12* (2016.01)
*H02J 50/50* (2016.01)
(Continued)

(52) U.S. Cl.
CPC ............ *H02J 50/12* (2016.02); *H02J 7/0013* (2013.01); *H02J 7/0047* (2013.01); *H02J 7/02* (2013.01); *H02J 50/50* (2016.02); *H02J 50/80* (2016.02)

(58) Field of Classification Search
CPC .......... H02J 50/50; H02J 50/502; H02J 50/10; H02J 50/12; H02J 50/40; H02J 50/402; H02J 7/025; H02J 5/005; H02J 7/342
See application file for complete search history.

(56) References Cited

U.S. PATENT DOCUMENTS

2008/0258679 A1  10/2008  Manico et al.
2011/0050164 A1   3/2011  Partovi et al.
(Continued)

FOREIGN PATENT DOCUMENTS

| CN | 108270294 A | * 7/2018 | ............. H02J 50/10 |
|---|---|---|---|
| KR | 10-2015-0123437 A | 11/2015 | |
| WO | 2017112949 A1 | 6/2017 | |

OTHER PUBLICATIONS

"The Authoritative Dictionary of IEEE Standards Terms, Seventh Edition," in IEEE Std 100-2000, pp. 809, Dec. 11, 2000 (Year: 2000).*
International Search Report and Written Opinion of the International Searching Authority in connection with International Application No. PCT/KR2020/013160 dated Dec. 23, 2020, 12 pages.

*Primary Examiner* — Edward Tso
*Assistant Examiner* — Ahmed H Omar

(57) ABSTRACT

A wireless power transmission/reception device and a method of operating the same have been provided. The electronic device includes a first housing structure including a first surface and a second surface facing in a direction opposite to the first surface, and a second housing structure including a third surface and a fourth surface facing in a direction opposite to the third surface. The second housing structure is rotatable relative to the first housing structure. The electronic device also includes a display and a control circuit. The first housing is provided with a first wireless charger configured to perform a wireless charging function in relation to a first external electronic device, and the second housing is provided with a second wireless charger configured to perform a wireless charging function in rela- (Continued)

tion to a second external electronic device. The second wireless charger is located to face the first wireless charger when the first housing structure and the second housing structure are folded to face each other.

14 Claims, 15 Drawing Sheets

(51) Int. Cl.
*H02J 7/02* (2016.01)
*H02J 7/00* (2006.01)
*H02J 50/80* (2016.01)

(56) References Cited

U.S. PATENT DOCUMENTS

| | | |
|---|---|---|
| 2013/0281160 A1 | 10/2013 | Han et al. |
| 2015/0256021 A1* | 9/2015 | Kwon .................. H02J 7/0042 |
| | | 320/108 |
| 2017/0170678 A1 | 6/2017 | Uhm |
| 2017/0316750 A1* | 11/2017 | Yamazaki ........... G02F 1/13318 |
| 2018/0032730 A1* | 2/2018 | Miller .................. G06F 21/554 |
| 2018/0166906 A1* | 6/2018 | Malhotra ............... A45C 15/00 |
| 2019/0165613 A1 | 5/2019 | Jung et al. |
| 2019/0174293 A1 | 6/2019 | Kerr et al. |
| 2019/0174497 A1 | 6/2019 | Wang et al. |

\* cited by examiner

WIRELESS POWER TRANSMISSION/RECEPTION DEVICE AND METHOD OF OPERATING THE SAME

CROSS-REFERENCE TO RELATED APPLICATION

This application is based on and claims priority under 35 U.S.C. 119 to Korean Patent Application No. 10-2019-0119948 filed on Sep. 27, 2019 in the Korean Intellectual Property Office, the disclosure of which is herein incorporated by reference in its entirety.

BACKGROUND

1. Field

Various embodiments relate to a wireless power transmission/reception device and a method for operating the same, and more particularly, to a wireless power transmission/reception device capable of wirelessly transmitting power using a conductive pattern and a method of operating the same.

2. Description of Related Art

With the recent development of wireless charging technology, a method of supplying and charging power to various electronic devices using a single charging device has been studied.

The wireless charging technology uses wireless power transmission and reception, and is, for example, a system in which a battery is automatically charged when the electronic device is simply placed on a charging pad without connecting the electronic device to a separate charging connector.

The wireless charging technology includes an electromagnetic induction method using a coil, a resonance method using resonance, and a radio wave radiation method that converts electrical energy into microwaves and transmits the microwaves.

A method of transmitting power by wireless charging is a method of transmitting power between a first coil of a transmitting end and a second coil of a receiving end. At the transmitting end, a magnetic field is generated, and at the receiving end, an electric current is induced or resonated according to a change in the magnetic field, thereby generating energy.

Recently, wireless charging technology using the electromagnetic induction method or the magnetic resonance method has been distributed mainly on electronic devices such as smartphones. When a power transmission unit (PTU) (e.g., a wireless charging pad) and a power reception unit (PRU) (e.g., a smartphone) are brought into contact with each other or approach within a certain distance of each other, the battery of the power reception device may be charged by electromagnetic induction or electromagnetic resonance between the transmitting coil of the power transmission device and the receiving coil of the power reception device.

SUMMARY

There may be a case where it is necessary to simultaneously charge the batteries of multiple electronic devices. According to the prior art, in order to simultaneously charge two or more electronic devices in a wireless manner, there may be a method of increasing the size of the chargeable area when the electronic devices are placed on the wireless charging device by providing a plurality of wireless charging devices (e.g., wireless power transmission devices) corresponding to respective electronic devices or increasing the number of windings of a wireless charging coil included in a wireless charging device. According to the above-described prior art, when the number of wireless charging devices provided is limited, it is difficult to simultaneously charge multiple electronic devices, and when the size of the chargeable area of the wireless charging device increases, the size of the charging pad increases, which may not meet the trend of miniaturization of electronic devices.

According to an embodiment, in the state in which an electronic device is placed on and charged by a wireless charging device (wireless power transmission device), another electronic device may be placed on the electronic device so that the other electronic device can be charged via the electronic device placed on the wireless charging device. For example, a charging coil included in the electronic device placed on the wireless charging device may be configured to charge another electronic device by performing the wireless power transmission function as well as the wireless power reception function under specified conditions. The charging coil included in the electronic device may suffer from deterioration in transmission/reception efficiency due to electromagnetic interference caused by an electronic component when the electronic device is disposed between the electronic device and the other electronic device. For example, when a display is positioned between the electronic device and the other electronic device, the transmission/reception efficiency of the charging coil may be deteriorated, and thus it may be difficult for the electronic device to sufficiently exhibit a function as a wireless charging device.

A wireless power transmission/reception device according to various embodiments and a method of operating the same are intended to solve the above-mentioned problems or other problems, and can simultaneously charge multiple electronic devices in a wireless manner. In addition, a wireless power transmission/reception device according to various embodiments and a method of operating the same can achieve high charging efficiency even when another electronic device is placed on the electronic device.

According to various embodiments, it is possible to provide an electronic device including: a first housing structure including a first surface facing in a first direction, and a second surface facing in a second direction opposite to the first direction; a second housing structure including a third surface facing in a third direction, and a fourth surface facing in a fourth direction opposite to the third direction, the second housing structure being disposed to be rotatable relative to the first housing structure to a state of at least partially facing the first housing structure; a display disposed on at least one of the first surface of the first housing structure and the third surface of the second housing structure; and a control circuit, wherein the first housing is provided with a first wireless charger configured to perform a wireless charging function in relation to an external electronic device, the second housing is provided with a second wireless charger configured to perform a wireless charging function in relation to the external electronic device, and the second wireless charger is located to face the first wireless charger in a state in which the first housing structure and the second housing structure are folded to face each other.

According to various embodiments, it is possible to provide a method of simultaneously charging multiple electronic devices including an electronic device capable of performing a wireless power reception function and a wireless power transmission function with respect to an external electronic device and a control circuit configured to control the electronic device, the method may include: identifying whether the electronic device is in a charging state; identifying whether the electronic device is in a folded state; identifying whether the external electronic device is close to the electronic device by a predetermined distance; and charging the external electronic device using the wireless power transmission function when a predetermined condition is satisfied.

According to various embodiments, it is possible to provide a method for displaying a charging situation when starting simultaneous charging of multiple electronic devices, the method may include: identifying whether a charging start event is detected; performing charging when the charging start event is detected; identifying charging priority based on a type of an external electronic device when the external electronic device is detected; and performing charging for the external electronic device a charging ratio higher than a charging ratio for the electronic device when charging priority of the external electronic device is higher than charging priority of the electronic device.

According to various embodiments, it is possible to simultaneously charge multiple electronic devices without providing multiple wireless charging devices.

According to various embodiments, in the case where an electronic device is used as a wireless charging device, charging efficiency is not deteriorated even when another electronic device is placed on the electronic device for charging.

According to various embodiments, when multiple electronic devices are being superimposed and being charged, a notification about a charging state of each of the multiple electronic devices can be displayed on the screen of the electronic device placed at the top.

According to various embodiments, charging can be efficiently controlled by varying charging priorities depending on various charging states such as the remaining amounts of batteries as well as the types of the electronic device while sufficiently ensuring the notification of the charging state of each electronic device at the time of starting simultaneous charging.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
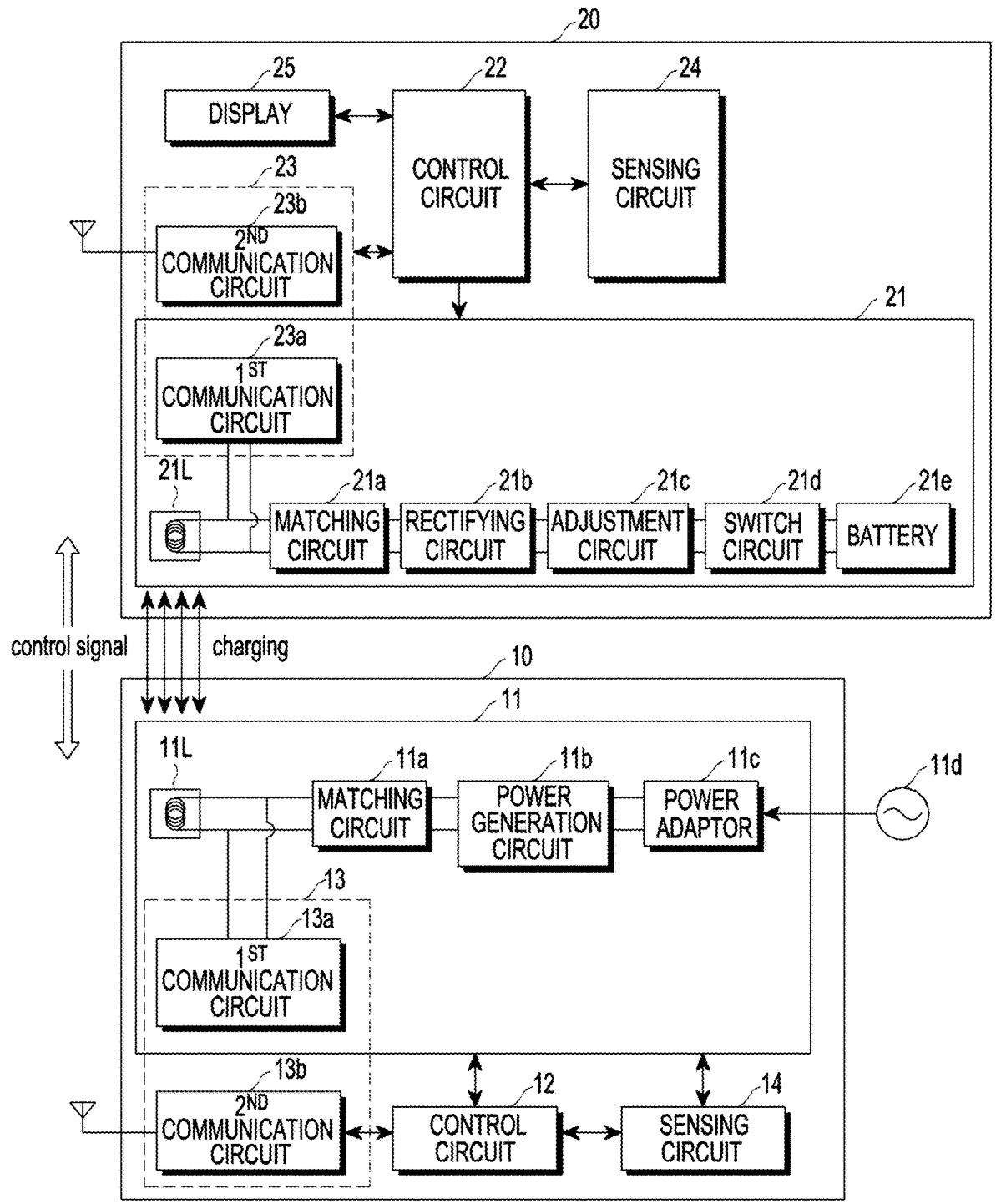
FIG. 1 illustrates a block diagram of a wireless power transmission device and an electronic device that receives wireless power, according to various embodiments.

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments disclosed herein will be described with reference to the accompanying drawings. It should be understood that the examples and terms used therein are not intended to limit the technology disclosed herein to specific embodiments, but include various modifications, equivalents, and/or substitutions of the corresponding examples. In connection with the description of drawings, similar components may be denoted by similar reference numerals. Unless the context clearly indicates otherwise, a singular expression may include a plural expression. Herein, the terms, such as "A or B" or "at least one of A and/or B" may include all possible combinations of the items listed with the terms. The terms, such as "1$^{st}$", "2$^{nd}$", "first", and "second", may modify corresponding constituent elements regardless of order or importance thereof, and are merely used in order to differentiate one constituent element from another constituent element without limiting the corresponding constituent elements. When it is described that a certain constituent element (e.g., a first constituent element) is "(functionally or communicatively) connected to" or "coupled to" another component (e.g., a second constituent element), the first constituent element may be directly connected to the second constituent element or may be connected to the second constituent element via another constituent element (e.g., a third constituent element).

In this document, the term "configured (set) to perform an operation", may be interchangeably used with terms, such as "suitable for an operation", "having capability of performing an operation", "modified to perform an operation", "made to perform an operation", "capable of performing an operation", or "designed to perform an operation" depending on the situation, for example, in hardware or software. In some situations, the expression "a device configured to perform an operation" may mean that the device "is capable of performing an operation" with other devices or components. For example, the phrase "a processor configured (or set) to perform A, B, and C" may mean a dedicate processor for performing the corresponding operations (e.g., an embedded processor) or a general-purpose processor (e.g., a CPU or an application processor) that is capable of performing corresponding operations by executing one or more software programs stored in a memory device.

According to various embodiments, an electronic device may include at least one of, for example, a smartphone, a tablet PC, a mobile phone, a video phone, an e-book reader, a desktop PC, a laptop PC, a netbook computer, a workstation, a server, a PDA, a portable multimedia player (PMP), an MP3 player, a medical device, a camera, or a wearable device. The wearable device may include an accessory-type wearable device (e.g., a watch, a ring, a bracelet, an ankle bracelet, a necklace, spectacles, a contact lens, or a head-mounted-device (HMD)), a fabric- or cloth-integrated wearable device (e.g., an electronic cloth), a body attachment-type wearable device (e.g., a skin pad or a tattoo), or an bio-implantable circuit. In some embodiments, the electronic device may include at least one of, for example, a television, a digital video disc (DVD) player, an audio device, a refrigerator, an air conditioner, a cleaner, an oven, a microwave, a washing machine, an air purifier, a set-top box, a home automation control panel, a security control panel, a media box (e.g., Samsung HomeSync™, Apple TV™, or Google TV®), a game console (e.g., Xbox™ or PlayStation™), an electronic dictionary, an electronic key, a camcorder, or an electronic picture frame.

In another embodiment, the electronic device may include at least one of various medical devices (e.g., various potable medical measurement devices (a blood glucose monitor, a heart rate monitor, a blood pressure monitor, or a clinical thermometer), a magnetic resonance angiography (MRA) device, a magnetic resonance imaging (MM) device, a computed tomography (CT) device, a camera, or an ultrasonic device), a navigation system, a global navigation satellite system (GNSS), an event data recorder (EDR), a flight data recorder (FDR), an automobile infotainment device, a ship electronic device (e.g., a ship navigation system or a gyro compass), an avionics device, a security device, a vehicle head unit, an industrial or home robot, a drone, an ATM of a financial institution, a point of sale (POS) terminal, or IoT devices (e.g., a bulb, various sensors, a sprinkler device, a fire alarm, a thermostat, a street lamp, a toaster, exercise equipment, a hot water tank, a heater, and a boiler). According to some embodiments, the electronic device may include at least one of furniture, a part of a building/structure or an automobile, an electronic board, an electronic-signature-receiving device, a projector, or various measuring instruments (e.g., a water supply, or electricity, gas, or electromagnetic wave measurement instrument). In various embodiments, the electronic device may be flexible or may be a combination of two or more of various devices described above. The electronic device according to an embodiment disclosed herein is not limited to the above-described devices. Herein, the term "user" may refer to a person who uses an electronic device or a device that uses an electronic device (e.g., an artificial intelligence electronic device). The electronic device is not limited as long as it is a device that can wirelessly transmit or receive wireless power.

The wireless charging technology uses wireless power transmission and reception, and is a system that can charge a battery of an electronic device (e.g., a mobile phone) without connecting a separate charging connector. Since a separate external device (e.g., a TA adaptor) for charging an electronic device is not required, the wireless charging technology can improve the portability of an electronic device, and since no connector is required for connection to an external device, the wireless charging technology can enhance a waterproof function.

A wireless power transmission device may transmit power to a wireless power reception device, using at least one of an inductive coupling method based on an electromagnetic induction phenomenon occurring by a wireless power signal and an electromagnetic resonance coupling method based on an electromagnetic resonance phenomenon occurring by a wireless power signal of a specific frequency.

The wireless power transmission method based on electromagnetic induction is a technology for wirelessly transmitting power, using a primary coil and a secondary coil for wireless charging, wherein a changing magnetic field generated by an electromagnetic induction phenomenon induces current in another coil so as to transmit power.

In the wireless power transmission method based on resonance coupling, electromagnetic resonance occurs in an electronic device by a wireless power signal transmitted from a wireless power transmission device, and the power is transmitted from the wireless power transmission device to the electronic device by the resonance phenomenon.

According to various embodiments, when a voltage or current flowing through a primary coil in the wireless power transmission device is changed during the power transmission of the wireless power transmission device, a magnetic field passing through the primary coil is changed by the current. The changing magnetic field generates electromotive force on the secondary coil side in the wireless power reception device. The electromotive force may be affected by the alignment and distance between the wireless power transmission device and the wireless power reception device including respective coils. Meanwhile, for the transmission of wireless power, the wireless power transmission device may be configured to include an interface surface in the form of a flat surface. One or more electronic devices may be placed on the interface surface, and a transmission coil may be mounted under the interface surface. In addition, an alignment indicator indicating a position where the electronic device is to be placed may be disposed on the interface surface. The alignment indicator may indicate the position of the electronic device at which the alignment between the transmission coil and the reception coil mounted under the interface surface can be appropriately performed. In some embodiments, the alignment indicator may be simple marks. In some embodiments, the alignment indicator may be disposed in the form of a protruding structure that guides the position of the electronic device. In addition, in some embodiments, the alignment indicator may be formed in the form of a magnetic body, such as a magnet mounted under the interface surface, so as to guide the coils to be appropriately aligned by mutual attraction with a magnetic body of another pole mounted inside the electronic device.

According to various embodiments, a wireless power transmission device (e.g., a charging pad) or a wireless power reception device (e.g., an electronic device) may output feedback according to an alignment state so as to improve charging efficiency. The feedback may include a voice message, a predetermined sound effect, vibration, a text message, a video image showing an example of correcting alignment through a display, or the like.

According to various embodiments, the wireless power transmission apparatus may be formed to include one or more transmission coils. The wireless power transmission apparatus is able to increase the power transmission efficiency by selectively using some coils appropriately aligned with the reception coil of the electronic device among the one or more transmission coils. In addition, the coils may be movable coils. When the position of the wireless power reception device is determined through a position detector, the wireless power transmission device may include a driver for moving the transmission coil such that the distance between the centers of the transmission coil and the reception coil of the electronic device is within a predetermined range, or for rotating the transmission coil such that the centers of the transmission coil and the reception coil overlap each other. The wireless power transmission device may further include a multiplexer that establishes and releases connection of some of the one or more transmission coils. When the position of the wireless power reception device placed on the interface surface is detected, the multiplexer may be controlled such that, among the one or more transmission coils, coils that can be in an inductive or resonant coupling relationship with the reception coil of the wireless power reception device can be connected to each other in consideration of the detected position.

According to various embodiments, a power converter of the wireless power transmission device may be configured to include one or more transmission coils and a resonance-forming circuit connected to each of the transmission coils. In addition, the power converter may further include a multiplexer that establishes and releases a connection of some of the one or more transmission coils. The one or more transmission coils may be set to have the same resonant frequency. According to an embodiment, some of the one or more transmission coils may be set to have different resonant frequencies, which may be determined depending on what inductance and/or capacitance the resonance-forming circuits respectively connected to the one or more transmission coils have.

FIG. 1 illustrates a block diagram of a wireless power transmission device and an electronic device that receives wireless power, according to various embodiments.

A wireless power transmission device 10 according to an embodiment may include at least one of a power transmission circuit 11, a control circuit 12, a communication circuit 13, or a sensing circuit 14. An electronic device 20 for wirelessly receiving power may include at least one of a power reception circuit 21, a control circuit 22, a communication circuit 23, a sensing circuit 24, or a display 25.

The power transmission circuit 11 according to an embodiment may provide power to the electronic device 20. The power transmission circuit 11 may include a power adaptor 11c, a power generation circuit 11b, a matching circuit 11a, a coil (or a conductive pattern) 11L, or a first communication circuit 13a. The power transmission circuit 11 may be configured to wirelessly transmit power to the electronic device 20 through the coil 11L. The power transmission circuit 11 may receive power from the outside in the form of a direct current or alternating current waveform, and may supply the received power to the electronic device 20 in the form of an alternating current waveform. The coil 11L may include multiple coils and/or coils wound multiple times.

The power adaptor 11c may receive AC or DC power input from the outside, or may receive a power signal of a built-in battery device and may output the power signal as DC power having a set voltage value. According to an embodiment, the power adaptor 11c may be electrically connected to a power supply 11d located outside. For example, a cable of the power supply 11d may be directly connected to the power adaptor 11c having a terminal. The voltage value of DC power output from the power adaptor 11c may be controlled by the control circuit 12. The DC power output from the power adaptor 11c may be output to the power generation circuit 11b.

The power generation circuit 11b may convert the DC current output from the power adaptor 11c into AC current, and may output the AC current. The power generation circuit 11b may include a predetermined amplifier (not illustrated). When the DC voltage or current input through the power adaptor 11c is less than a set gain, the DC voltage or current may be amplified to a set value, using the amplifier. The power generation circuit 11b may include a circuit for converting the DC current input from the power adaptor 11c into AC current on the basis of a control signal input from the control circuit 12. The power generation circuit 11b according to various embodiments may include a bridge circuit including multiple switches. The coil 11L may include multiple coils (or coils wound multiple times), and the multiple coils (or coils wound multiple times) may share at least a portion of the power generation circuit 11b. This will be described later in more detail. For example, the power generation circuit 11b may convert the DC current into AC current through a predetermined inverter. The power generation circuit 11b may include a gate-driving device (not illustrated). The gate-driving device may change the DC current into AC current while performing control by turning on/off the DC current. Alternatively, the power generation circuit 11b may generate an AC power signal through a wireless power generator (e.g., an oscillator).

The matching circuit 11a may perform impedance matching. For example, when an AC signal output from the power generation circuit 11b is transmitted to the coil 11L, an electromagnetic field may be formed in the coil 11L by the AC signal. In various embodiments, an AC signal may be provided only to some of multiple coils (or a coil wound multiple times), which will be described later in more detail. The frequency band of the formed electromagnetic field signal can be adjusted by adjusting the impedance of the matching circuit 11a. The matching circuit 11a may perform control such that the output power transmitted to the electronic device 20 through the coil 11L by impedance adjustment becomes a highly efficient or high output. The matching circuit 11a may regulate the impedance on the basis of the control of the control circuit 12. The matching circuit 11a may include at least one of an inductor (e.g., a coil (or a conductive pattern)), a capacitor, and a switch device. The control circuit 12 may control the connection state to at least one of the inductor or the capacitor through the switch device, and may thus perform impedance matching. At least one of the control circuit 12 or the control circuit 22 can be implemented in a variety of circuits, such as a general-purpose such as a CPU, a mini computer, a microprocessor, a micro controlling unit (MCU), or a field programmable gate array (FPGA), and there is no limit in type.

The coil 11L may form a magnetic field for inducing or resonating current in the electronic device 20 when current is applied thereto. The first communication circuit 13a (e.g., a resonant circuit) may perform communication (e.g., data communication) in an in-band format, using electromagnetic waves generated by the coil 11L.

The sensing circuit 14 may periodically or aperiodically measure a change in current/voltage applied to the coil 11L of the power transmission circuit 11. The wireless power transmission device 10 may change the amount of power to be transmitted depending on the change in current/voltage applied to the coil 11L. Alternatively, the sensing circuit 14 may sense the temperature change of the wireless power transmission device 10 periodically or aperiodically.

According to an embodiment, the sensing circuit 14 may include at least one of a current/voltage sensor or a temperature sensor.

The control circuit 12 may perform control such that power is wirelessly transmitted to the electronic device 20 through the power transmission circuit 11. The control circuit 12 may perform control such that information is wirelessly transmitted to or received from the electronic device 20 through the communication circuit 13. The control circuit 12 may calculate the amount of power received from the electronic device 20, based on the current or voltage measured by the sensing circuit 14.

According to an embodiment, the received information may include charging setting information related to a battery state of the electronic device 20, power amount control information related to adjustment of the amount of power transmitted to the electronic device 20, environmental information related to a charging environment of the electronic device 20, or time information of the electronic device 20.

The charging setting information may be information related to the battery state of the electronic device 20 at the time of wireless charging between the wireless power transmission device 10 and the electronic device 20. For example, the charging setting information may include at least one of the total battery capacity, the remaining battery capacity, the number of charging times, the battery usage amount, the charging mode, the charging method, or the wireless reception frequency band of the electronic device 20.

The power amount control information may be information for controlling the amount of initial power transmitted depending on a change in the amount of power charged to the electronic device 20 during wireless charging between the wireless power transmitter 10 and the electronic device 20.

The environment information is information obtained by measuring the charging environment of the electronic device 20 by the sensing circuit 24 of the electronic device 20. The environment information may include at least one of, for example, temperature data including at least one of the internal temperature or the external temperature of the electronic device 20, illuminance data representing illuminance (brightness) around the electronic device 20, or sound data representing sound (noise) around the electronic device 20.

The control circuit 12 may perform control such that power to be transmitted to the electronic device 20 is generated based on the charging setting information among the received information. Alternatively, the control circuit 12 may determine or change the amount of power transmitted to the electronic device 20 based on at least some of the received information (e.g., at least one of the power amount control information, the environment information, or the time information). Alternatively, control may be performed such that the matching circuit 11a changes impedance.

The communication circuit 13 may communicate with the electronic device 20 in a predetermined manner. The communication circuit 13 may perform data communication with the communication circuit 23 of the electronic device 20. For example, the communication circuit 13 may unicast, multicast, or broadcast the signal.

According to an embodiment, the communication circuit 13 may include at least one of, for example, a first communication circuit 13a implemented as one piece of hardware with the power transmission circuit 11 so that the wireless power transmission device 10 can perform communication in an in-band format, and a second communication circuit 13b implemented as hardware different from the power transmission circuit 11 so that the wireless power transmission device 10 can perform communication in an out-of-band format.

According to an embodiment, when the communication circuit 13 includes the first communication circuit 13a capable of performing communication in the in-band format, the first communication circuit 13 is capable of receiving the frequency and the signal level of an electromagnetic field signal received through the coil 11L of the power transmission circuit 11. The control circuit 12 may decode the frequency and the signal level of the received electromagnetic field signal so as to extract information received from the electronic device 20. Alternatively, the first communication circuit 13 may apply a signal for information of the wireless power transmission device 10, which is to be transmitted to the electronic device 20, to the coil 11L of the wireless transmission circuit 11, or may add the signal for the information of the wireless power transmission device 10 to an electromagnetic field signal generated when a signal output from the matching circuit 11a is applied to the coil 11L, so as to transmit the signal for the information of the wireless power transmission device 10 to the electronic device 20. The control circuit 12 may perform control such that the signal is output after changing the connection state of the matching circuit 11a to at least one of the inductor or the capacitor of the matching circuit 11a through the on/off control of a switch device included in the matching circuit 11a.

According to an embodiment, when the communication circuit 13 includes the second communication circuit 13b capable of performing communication in the out-of-band format, the second communication circuit 13b may communicate with the communication circuit 23 of the electronic device 20, using nearfield communication (NFC), ZigBee communication, infrared communication, visible light communication, Bluetooth low energy (BLE) communication, or the like.

The above-mentioned communication methods of the communication circuit 13 are merely examples, and the embodiments disclosed herein are not limited to the specific communication methods performed by the communication circuit 13.

According to an embodiment, the electronic device 20 may include a power reception circuit 21, a control circuit 22, a communication circuit 23, a sensing circuit 24, or a display 25. The power reception circuit 21 of the electronic device 20 may receive power from the power transmission circuit 11 of the wireless power transmission device 10. The power reception circuit 21 may be implemented in the form of an embedded battery, or may be implemented in the form of a power reception interface so as to receive power from the outside. The power reception circuit 21 may include a matching circuit 21a, a rectifying circuit 21b, an adjustment circuit 21c, a switch circuit 21d, a battery 21e, or a coil 21L.

The power reception circuit 21 may receive, through the coil 21L, the wireless power in the form of electromagnetic waves generated in response to the current/voltage applied to the coil 11L of the power transmission circuit 11. For example, the power reception circuit 21 may receive power using electromotive force formed in the coil 11L of the power transmission circuit 11 and the coil 21L of the power reception circuit 21.

The matching circuit 21a may perform impedance matching. For example, the power transmitted through the coil 11L of the wireless power transmission device 10 may be transmitted to the coil 21L so as to form an electromagnetic field. The matching circuit 21a may adjust the frequency band of the formed electromagnetic field signal by adjusting the impedance. The matching circuit 21a may perform control such that the input power received from the wireless power transmission device 10 through the coil 21L through this impedance adjustment becomes a highly efficient and high output. The matching circuit 21a may regulate the impedance on the basis of the control of the control circuit 22. The matching circuit 21a may include at least one of an inductor (e.g., a coil (or a conductive pattern)), a capacitor, and a switch device. The control circuit 22 may control the connection state to at least one of the inductor or the capacitor through the switch device, and may thus perform impedance matching.

The rectifying circuit 21b may rectify the wireless power received by the coil 21L in a DC form and may be implemented, for example, in the form of a bridge diode.

The adjustment circuit 21c may convert the rectified power into a set voltage or current. The adjustment circuit 21c may include a predetermined DC/DC converter (not illustrated). For example, the adjustment circuit 21c may convert the rectified power such that the voltage at the output end becomes 5V. Meanwhile, an applicable minimum value or maximum value of the voltage may be set at the previous stage of the adjustment circuit 21c.

The switch circuit 21d may connect the adjustment circuit 21c and the battery 21e to each other. The switch circuit 21d may maintain the on/off state under the control of the control circuit 22.

The battery 21e may be charged by receiving the power input from the adjustment circuit 21c. In another embodiment, a charger (not illustrated) may be further disposed between the switch circuit 21d and the battery 21e, and the charger (not illustrated) may change the voltage or current of the power input through a predetermined mode (e.g., a constant current (CC) mode or a constant voltage (CV) mode) so as to charge the battery 21e. In various embodiments, the DC/DC converter of the adjustment circuit 21c may directly charge the battery 21e, or the charger (not illustrated) may adjust the power output from the adjustment circuit 21c once again so as to charge the battery 21e.

The sensing circuit 24 may sense a change in the power state received to the electronic device 20. For example, the sensing circuit 24 may periodically or aperiodically measure the current/voltage value received to the coil 21L through a predetermined current/voltage sensor. The electronic device 20 may calculate the amount of power received thereto, based on the measured current/voltage. The electronic device 20 may be used to change the matching circuit 21a, based on the measured current/voltage.

According to an embodiment, the sensing circuit 24 may sense a change in the charging environment of the electronic device 20. For example, the sensing circuit 24 may periodically or aperiodically measure at least one of the internal temperature and the external temperature of the electronic device 20 through a predetermined temperature sensor.

The display 25 may display overall information related to the charging state of the electronic device 20. For example, the display 25 may display at least one of the total battery capacity, the remaining battery capacity, the battery charge amount, the battery usage amount, or the estimated charging time of the electronic device 20.

The communication circuit 23 may communicate with the wireless power transmission device 10 in a predetermined manner. The communication circuit 23 may perform data communication with the communication circuit 13 of the wireless power transmission device 10. The communication circuit 23 may exchange a control signal with the wireless power transmission device 10 through data communication. The communication circuit 23 may operate similar or identical to the communication circuit 13 of the wireless power transmission device 10.

The control circuit 22 may transmit charging setting information for receiving the required amount of power to the wireless power transmission device 10 through the communication circuit 23, based on the information related to the battery state of the electronic device 20. For example, when the wireless power transmission device 10 capable of transmitting wireless power is identified, the control circuit 22 may transmit the charging setting information for receiving a required amount of power to the wireless power transmission device 10 through the communication circuit 23, based on at least one of the total battery capacity, the remaining battery capacity, the number of charging times, the battery usage amount, the charging mode, the charging method, or the wireless reception frequency band of the electronic device 20.

The control circuit 22 may transmit, to the wireless power transmission device 10, the power amount control information for controlling the amount of power received from the wireless power transmission device 10 depending on a change in the amount of power charged to the electronic device 20 through the communication circuit 23. The first communication circuit 23a may include a switch and a capacitor or resistor. A second communication circuit 23b may be the same as the a second communication circuit 13b. The control circuit 22 may turn on/off the switch according to a binary code of data to be transmitted, based on an on/off keying modulation method. Based on the impedance sensed by the wireless power transmission device 10, a change in the magnitude of power or the magnitude of the current in the power transmission circuit 11 may be detected according to the on/off of the switch, and may be demodulated into a binary code. Thus, the electronic device 20 may acquire data to be transmitted.

The control circuit 22 may transmit the environmental information according to a change in the charging environment of the electronic device 20 to the wireless power transmission device 10. For example, when the temperature data value measured by the sensing circuit 24 is greater than or equal to a set temperature reference value, the control circuit 22 may transmit the measured temperature data to the wireless power transmission device 10.

Although FIG. 1 illustrates that the wireless power transmission apparatus 10 and the electronic device 20 according to an embodiment only include the power transmission circuit 11 and the power reception circuit 21, respectively, each of the wireless power transmission apparatus 10 and the electronic device 20 may include both the power transmission circuit 11 and the power reception circuit 21. Accordingly, the wireless power transmission device 10 and the electronic device 20 according to an embodiment may perform both functions of a power transmission device and an electronic device.

Figure 2:
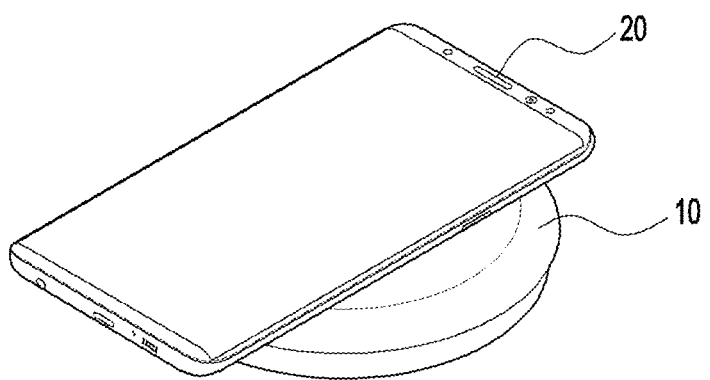
FIG. 2 illustrates a use aspect of a wireless power transmission device and an electronic device that receives wireless power, according to various embodiments.

FIG. 2 illustrates a use aspect of a wireless power transmission device and an electronic device that receives wireless power, according to various embodiments.

As illustrated in FIG. 2, the wireless power transmission device 10 may include, for example, a housing having a shape capable of supporting the electronic device 20. The electronic device 20 may be disposed on the wireless power transmission device 10. At least one of the constituent elements of the wireless power transmission device 10 described above with reference to FIG. 1 may be disposed in the housing of the wireless power transmission device 10.

Figure 3:
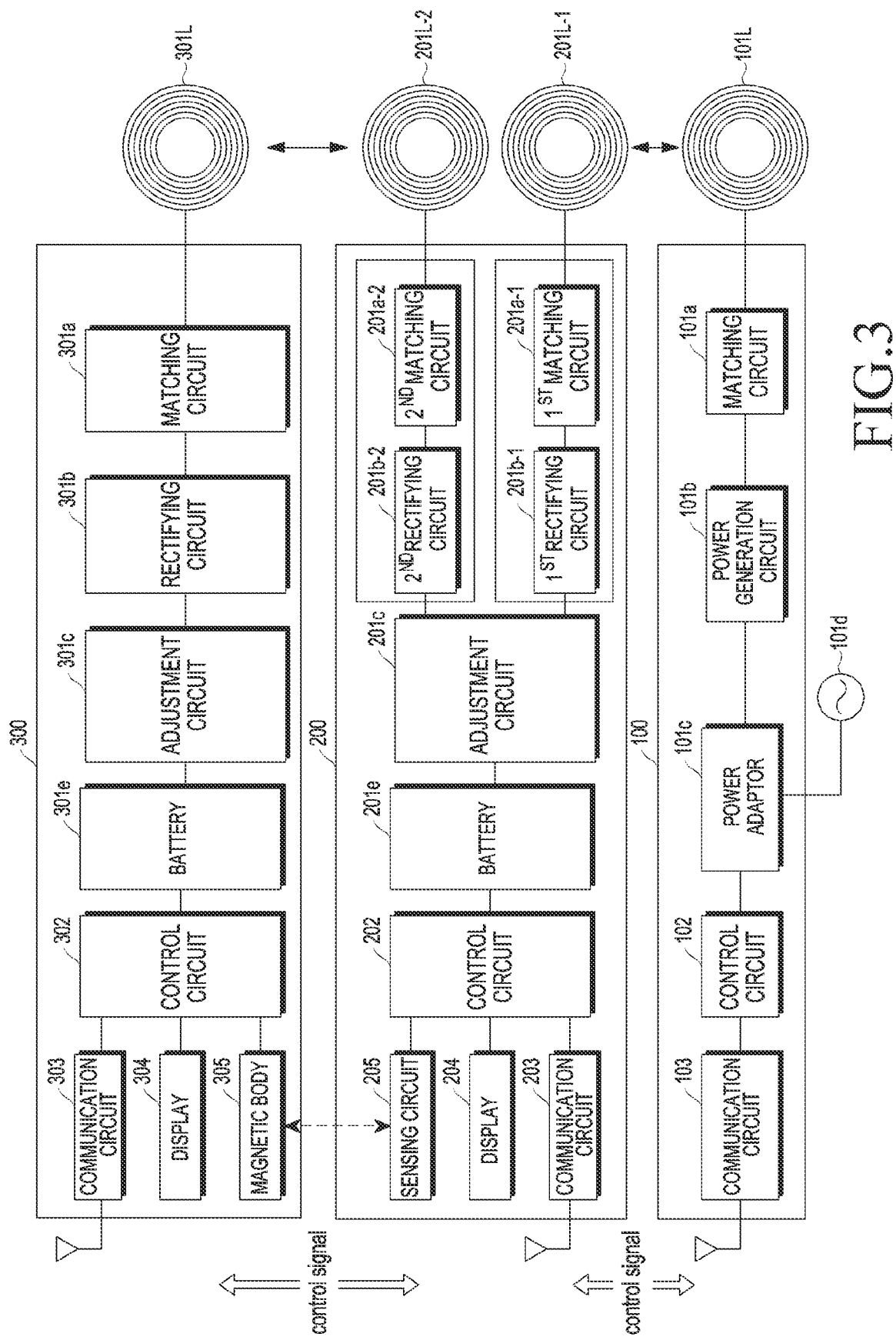
FIG. 3 illustrates a block diagram of a wireless power transmission device and electronic devices for wireless charging according to various embodiments.

FIG. 3 illustrates a block diagram of a wireless power transmission device 100 and electronic devices 200 and 300 for wireless charging according to various embodiments.

According to various embodiments, simultaneous wireless charging of two electronic devices 200 and 300 may be possible with respect to one wireless power transmission device 100.

The wireless power transmission device 100 (e.g., the wireless power transmission device in FIG. 1) according to an embodiment may include at least one of a power transmission circuit (not illustrated), a control circuit 102, a communication circuit 103, or a sensing circuit (not illustrated). In addition, the electronic device 200 (e.g., the electronic device 20 in FIG. 1) may include at least one of a power transmission/reception circuit, a control circuit 202, a communication circuit 203, a sensing circuit 205, or a display 204. In addition, another electronic device 300 (e.g., the electronic device 20 in FIG. 1) may include at least one of a power reception circuit, a control circuit 302, a communication circuit 303, a sensing circuit (not illustrated), a display 304, or a magnetic body 305. The embodiment of FIG. 3 is different from the embodiment described above with reference to FIG. 1 in that the electronic device 200 of FIG. 3 may explicitly include a power transmission/reception circuit. In addition, each of the electronic device 200 and the other electronic device 300 may have a configuration similar to that of the electronic device 20 of FIG. 1, and may perform similar functions accordingly.

The power transmission circuit (not illustrated) of the wireless power transmission device 100 according to an embodiment may provide power to the electronic device 200. The power transmission circuit may include at least one of a power adaptor 101c, a power generation circuit 101b, a matching circuit 101a, a coil (or a conductive pattern) 101L, or a first communication circuit 103. The power transmission circuit may be configured to wirelessly transmit power to the electronic device 200 through the coil 101L. Other components of the power transmission circuit (not illustrated) may be the same as the power transmission circuit 11 illustrated in FIG. 1.

The power adaptor 101c may receive AC or DC power input from the outside, or may receive a power signal of a built-in battery device and may output the power signal as DC power having a set voltage value. According to an embodiment, the power adaptor 101c may be electrically connected to an external power supply 101d. For example, a cable of the power supply 101d may be directly connected to the power adaptor 101c having a terminal. The voltage value of DC power output from the power adaptor 101c may be controlled by the control circuit 102. The DC power output from the power adaptor 101c may be output to the power generation circuit 101b.

The power generation circuit 101b may convert the DC current output from the power adaptor 101c into AC current, and may output the AC current. The power generation circuit 101b may include a predetermined amplifier (not illustrated). When the DC voltage or current input through the power adaptor 101c is less than a set gain, the DC voltage or current may be amplified to a set value, using the amplifier. The power generation circuit 101b may include a circuit for converting the DC current input from the power adaptor 101c into AC current on the basis of a control signal input from the control circuit 102. Other components of the power generation circuit 101b may be the same as the power generation circuit 11b illustrated in FIG. 1.

The matching circuit 101a may perform impedance matching. For example, when an AC signal output from the power generation circuit 101b is transmitted to the coil 101L, an electromagnetic field may be formed in the coil 101L by the AC signal. The frequency band of the formed electromagnetic field signal can be adjusted by adjusting the impedance of the matching circuit 101a. The matching circuit 101a may perform control such that the output power transmitted to the electronic device 200 through the coil 101L by impedance adjustment becomes a highly efficient or high output. Other components of the matching circuit 101a may be the same as the matching circuit 11a illustrated in FIG. 1.

The coil 101L may form a magnetic field for inducing or resonating current in the electronic device 200 when current is applied thereto. The communication circuit 103 (e.g., a resonant circuit) may perform communication (e.g., data communication) in an in-band format, using electromagnetic waves generated by the coil 101L.

The control circuit 102 may perform control such that power is wirelessly transmitted to the electronic device 200 through the power transmission circuit (not illustrated). The control circuit 102 may perform control such that information is wirelessly transmitted to or received from the electronic device 200 through the communication circuit 103. Other components of the control circuit 102 may be the same as the control circuit 12 illustrated in FIG. 1.

The communication circuit 103 may communicate with the electronic device 200 in a predetermined manner. The communication circuit 103 may perform data communication with the communication circuit 203 of the electronic device 200. Other components of the communication circuit 103 may be the same as the communication circuit 13 illustrated in FIG. 1.

The wireless power transmission device 100 according to the embodiment illustrated in FIG. 3 may include, in addition to the above-described configurations, other components, including a sensing circuit (e.g., the sensing circuit 14 in FIG. 1), additionally or alternatively. In addition, the embodiment described with reference to FIG. 1 may be applicable, mutatis mutandis, to features not specifically described with respect to respective components corresponding to the embodiment illustrated in FIG. 1.

According to an embodiment, the electronic device 200 may include a power transmission/reception circuit (not illustrated), a control circuit 202, a communication circuit 203, a sensing circuit 205, or a display 204. The power transmission/reception circuit of the electronic device 200 may receive power from the power transmission circuit of the wireless power transmission device 100 as a power reception function. In order to perform the power reception function, the electronic device 200 may include a first matching circuit 201a-1, a first rectifying circuit 201b-1, or a first coil 201L-1, and may include an adjustment circuit 201c, a switch circuit (not shown), or a battery 201e. A circuit for performing the power reception function may be implemented in the form of an embedded battery, or may be implemented in the form of a power reception interface so as to receive power from the outside. The power transmission/reception circuit of the electronic device 200 may transmit power to another electronic device 300 as a power transmission function. In order to perform the power transmission function, the electronic device 200 may include a second matching circuit 201a-2, a second rectifying circuit 201b-2, or a second coil 201L-2. In order to perform the power transmission function, the electronic device 200 may include an adjustment circuit, a switch circuit, or a battery.

According to an embodiment, in performing the power reception function and the power transmission function, at least one of the adjustment circuit 201c, the switch circuit, or the battery 201e may be commonly used. A circuit for performing the power reception function may be implemented in the form of an embedded battery, or may be implemented in the form of a power reception interface so as to receive power from the outside.

The first matching circuit 201a-1 may perform impedance matching. For example, the power transmitted through the coil 101L of the wireless power transmission device 100 may be transmitted to the first coil 201L-1 so as to form an electromagnetic field. The first matching circuit 201a-1 may adjust the frequency band of the formed electromagnetic field signal by adjusting the impedance. The first matching circuit 201a-1 may perform control such that the input power received from the wireless power transmission device 100 through the first coil 201L-1 through this impedance adjustment becomes a highly efficient and high output. The first matching circuit 201a-1 may adjust the impedance on the basis of the control of the control circuit 202. Other components of the first matching circuit 201a-1 may be the same as the matching circuit 21a illustrated in FIG. 1. The second matching circuit 201a-2 may also perform impedance matching. For example, when the AC signal is transmitted to the second coil 201L-2, an electromagnetic field may be formed in the second coil 201L-2 by the AC signal. The frequency band of the formed electromagnetic field signal may be adjusted by adjusting the impedance of the second matching circuit 201a-2. The second matching circuit 201a-2 may perform control such that the output power transmitted to another electronic device 300 through the second coil 201L-2 by impedance adjustment becomes highly efficient or high output. Other components of the second matching circuit 201a-2 may be the same as the matching circuit 11a illustrated in FIG. 1.

The first rectifying circuit 201b-1 may rectify the wireless power received to the first coil 201L-1 in a DC current form. The second rectifying circuit 201b-2 may rectify an AC signal to be transmitted from the second coil 201L-2 in a DC current form. The first rectifying circuit 201b-2 and the second rectifying circuit 201b-2 may be implemented, for example, in the form of a bridge diode.

The adjustment circuit 201c may convert the rectified power into a set voltage or current. Alternatively, the adjustment circuit 201c may convert the rectified power to set power according to the set voltage or current. The battery 201e may be charged by receiving the power input from the adjustment circuit 201c. According to various embodiments, the electronic device 200 may further include a switch circuit (not illustrated). In another embodiment, a charger (not illustrated) may be further disposed between the switch circuit and the battery 201e. The configuration of the adjustment circuit 201c, the battery 201e, or the switch circuit may be the same as the adjustment circuit 21c, the battery 21e, or the switch circuit 21d illustrated in FIG. 1.

The sensing circuit 205 may sense a change in the power state received to the electronic device 200. For example, the sensing circuit 205 may periodically or aperiodically measure the current/voltage value received to the coils 201L-1 and 201L-2 through a predetermined current/voltage sensor. The electronic device 200 may calculate the amount of power received thereto, based on the measured current/voltage. The electronic device 200 may be used to change the first matching circuits 201a-1 and the second matching circuit 201a-2, based on the measured current/voltage.

According to an embodiment, the sensing circuit 205 may sense a change in the charging environment of the electronic device 200. For example, the sensing circuit 205 may periodically or aperiodically measure at least one of the internal temperature and the external temperature of the electronic device 200 through a predetermined temperature sensor.

In addition, the sensing circuit 205 may measure the proximity of another electronic device 300. The electronic device 200 may be used to determine whether to perform a power transmission function, based on the measured proximity information of another electronic device 300.

The display 204 may display overall information related to the charging state of the electronic device 200. For example, the display 204 may display at least one of the total battery capacity, the remaining battery capacity, the battery charge amount, the battery usage amount, or the estimated charging time of the electronic device 20.

The communication circuit 203 may communicate with the wireless power transmission device 100 and/or another electronic device 300 in a predetermined manner. The communication circuit 203 may perform data communication with the communication circuit 103 of the wireless power transmission device 100 and/or the communication circuit 303 of another electronic device 300. The communication circuit 203 may exchange a control signal with the wireless power transmission device 10 and/or another electronic device 300 through data communication. The descriptions of the communication circuit 13 and/or the communication circuit 23 in FIG. 1 may be applicable, mutatis mutandis, to other descriptions of the communication circuit 13 and/or the communication circuit 23.

The control circuit 202 may transmit charging setting information for receiving the required amount of power to the wireless power transmission device 100 through the communication circuit 203, based on the information related to the battery state of the electronic device 200. In addition, the control circuit 202 may transmit charging setting information for receiving the required amount of power to another electronic device 300 through the communication circuit 203, based on the information related to the battery state of the another electronic device 300. In contrast, the control circuit 202 may receive charging setting information for receiving the required amount of power from another electronic device 300 through the communication circuit 203, based on the information related to the battery state of the another electronic device 300. The descriptions of the control circuit 12 and the control circuit 22 in FIG. 1 may be applicable, mutatis mutandis, to other descriptions of the control circuit 22.

According to an embodiment, the electronic device 300 may include a power reception circuit (not illustrated), a control circuit 302, a communication circuit 303, a magnetic body 305, or a display 304. The power reception circuit of the electronic device 300 may receive power from the power transmission circuit of the electronic device 200 as a power reception function. In order to perform the power reception function, the electronic device 300 may include a matching circuit 301a, a rectifying circuit 301b, or a coil 301L, and may include an adjustment circuit 301c, a switch circuit, or a battery 301e. A circuit for performing the power reception function may be implemented in the form of an embedded battery, or may be implemented in the form of a power reception interface so as to receive power from the outside.

The matching circuit 301a may perform impedance matching. For example, the electric power transmitted through the second coil 201L-2 of the electronic device 200 may be transmitted to the coil 301L to form an electromagnetic field. The matching circuit 301a may adjust the frequency band of the formed electromagnetic field signal by adjusting the impedance. Through this regulation, the matching circuit 301a may perform control such that the input power received from the electronic device 200 through the coil 301L becomes a highly efficient and high output. The matching circuit 301a may regulate the impedance on the basis of the control of the control circuit 302. Other components of the matching circuit 301a may be the same as the matching circuit 21a illustrated in FIG. 1.

The rectifying circuit 301b may rectify the wireless power received to the first coil 301L in a DC current form. The adjustment circuit 301c may convert the rectified power into a set voltage or current. Alternatively, the adjustment circuit 301c may convert the rectified power to set power according to the set voltage or current. The battery 301e may be charged by receiving the power input from the adjustment circuit 301c. According to various embodiments, the electronic device 300 may further include a switch circuit (not illustrated). In another embodiment, a charger (not illustrated) may be further disposed between the switch circuit and the battery 301e. The configuration of the adjustment circuit 301c, the battery 301e, or the switch circuit may be the same as the adjustment circuit 21c, the battery 21e, or the switch circuit 21d illustrated in FIG. 1.

According to the embodiment illustrated in FIG. 3, the electronic device 300 may further include a sensing circuit (not illustrated) for sensing a state change of power received from the electronic device 200. In addition, the electronic device 300 may further include at least one magnetic body 305. The magnetic body 305 included in the electronic device 300 is detected by the sensing circuit 205 provided in the electronic device 200, and thus the electronic device 200 can determine whether the electronic device 300 is in proximity.

As will be described later, the display 304 may display not only the charging state of the electronic device 300, but also overall information related to the charging state of the electronic device 200. This will be described later in detail in the embodiment of FIG. 13.

The communication circuit 303 may communicate with the electronic device 200 in a predetermined manner. The communication circuit 303 may perform data communication with the communication circuit 203 of the electronic device 200. The communication circuit 303 may exchange a control signal with the electronic device 200 through data communication.

The control circuit 302 may transmit charging setting information for receiving the required amount of power to the electronic device 200 through the communication circuit 303, based on the information related to the battery state of the electronic device 300.

In FIG. 3, configurations in which multiple electronic devices 200 and 300 can be wirelessly charged using one wireless power transmission device 100 are illustrated. Here, one electronic device 200 may be differentiated from conventional techniques in that a function of wirelessly transmitting power and a function of wirelessly receiving power can be performed together and/or simultaneously.

Meanwhile, the electronic device 200 according to various embodiments may be an electronic device having at least two housings. A foldable electronic device or a detachable electronic device may correspond to the electronic device 200. Here, the foldable electronic device may be an electronic device having two housings and a hinge connecting the two housings, and the detachable electronic device may be an electronic device in which the two housings can be connected to each other through other means (e.g., a magnetic body) without a hinge.

Conventionally, when an electronic device (e.g., 200) is used as a medium for charging another electronic device (e.g., 300), there is a problem in that charging efficiency is significantly reduced due to interference by an electronic component such as a display. According to various embodiments, by providing a foldable electronic device or a detachable electronic device as an electronic device, there is an advantage in that the problem of reduced charging efficiency in the prior art can be solved.

Hereinafter, as an electronic device 200 serving as a medium for wireless charging through FIGS. 4A to 9, a foldable electronic device may be described as an example. The following description may also be applicable to a detachable electronic device.

Figure 4A:
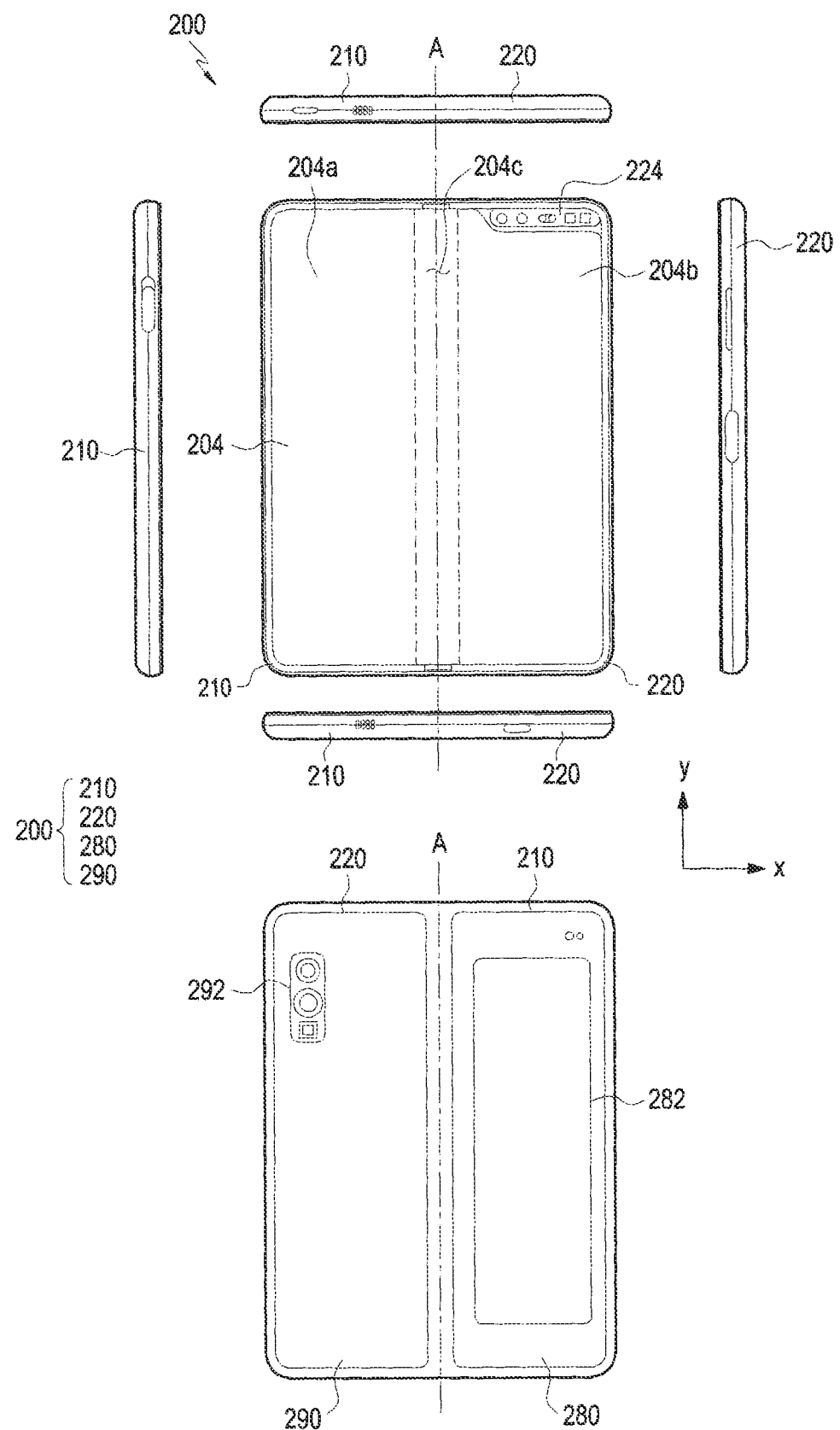
FIG. 4A illustrates a view of the state in which an electronic device according to various embodiments is unfolded.
Figure 4B:
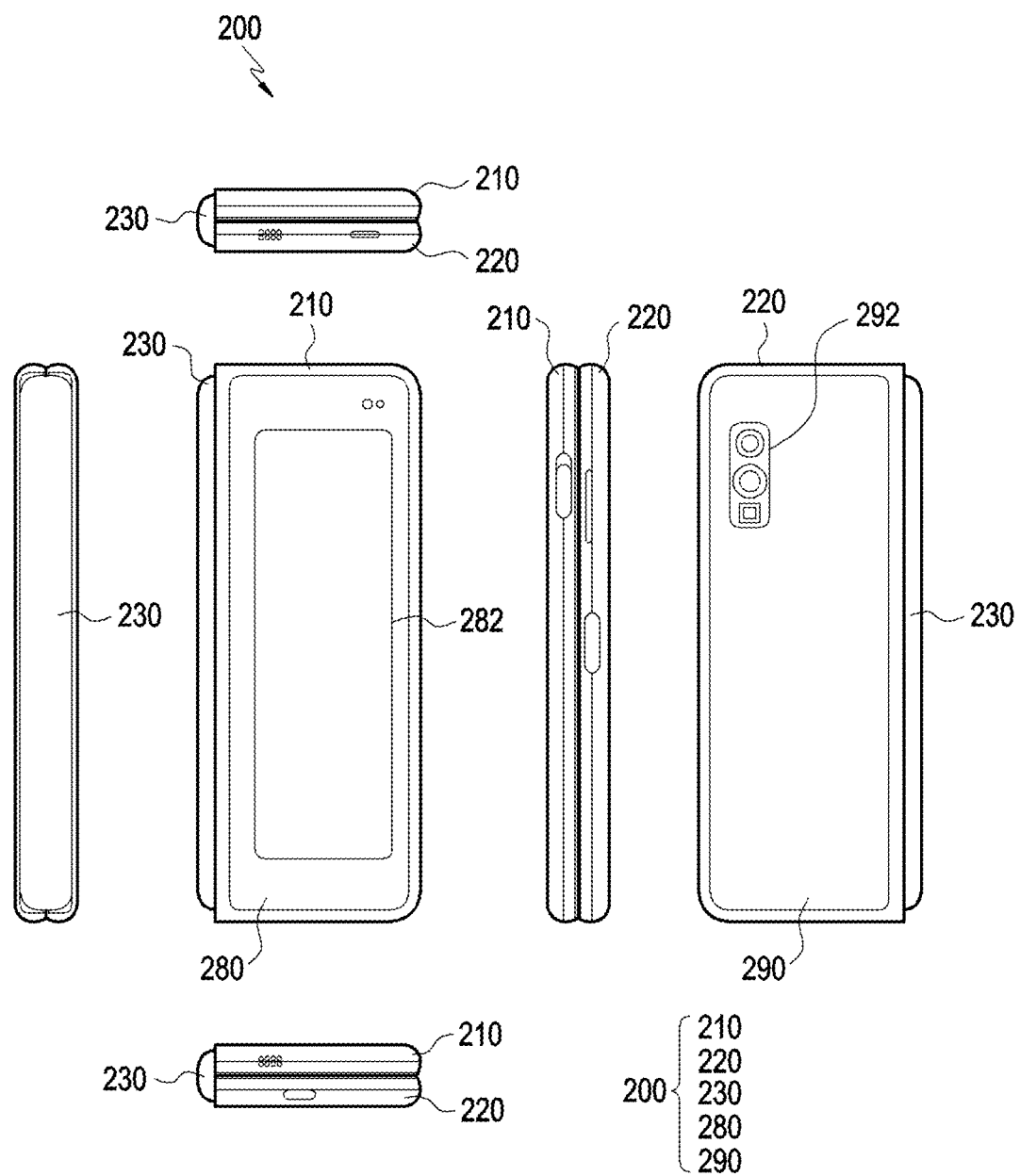
FIG. 4B illustrates a view of the state in which an electronic device according to various embodiments is folded.

First, a foldable electronic device 200 will be described with reference to FIGS. 4A and 4B. FIG. 4A illustrates a view of the state in which an electronic device 200 according to various embodiments is unfolded. FIG. 4B is a view illustrating the state in which an electronic device 200 according to various embodiments is folded.

Referring to FIGS. 4A and 4B, in an embodiment, an electronic device 200 may include a foldable housing, a hinge cover (e.g., a hinge cover 230 in FIG. 5) that covers the foldable portion of the foldable housing, and a flexible or foldable display 204 (hereinafter, simply referred to as a "display" 204) disposed in a space formed by the foldable housing. According to an embodiment, the surface on which the display 204 is disposed may be defined as the front surface of the electronic device 200. The surface opposite the front surface may be defined as the rear surface of the electronic device 200. In addition, the surface surrounding the space between the front surface and the rear surface may be defined as a side surface of the electronic device 200.

According to various embodiments, the foldable housing may include a first housing structure 210, a second housing structure 220 including a sensor area 224, a first rear cover 280, a second rear cover 290, and a hinge structure. Here, the hinge structure may be surrounded by a hinge cover (e.g., the hinge cover 230 in FIG. 4B). The foldable housing of the electronic device 200 is not limited to the shape and assembly illustrated in FIGS. 4 and 5, but may be implemented by combining or assembling other shapes and/or components. For example, in another embodiment, the first housing structure 210 and the first rear cover 280 may be integrally formed, and the second housing structure 220 and the second rear cover 290 may be integrally formed.

According to various embodiments, the first housing structure 210 may be connected to the hinge structure, and may include a first surface facing in a first direction and a second surface facing in a second direction opposite to the first direction. The second housing structure 220 may be connected to the hinge structure, and may include a third surface facing in a third direction and a fourth surface facing in a fourth direction opposite the third direction. The second housing structure 220 is rotatable about the hinge structure (or a folding axis A) relative to the first housing structure 210. Accordingly, the electronic device 200 may be deformable into the folded state or the unfolded state. In the folded state of the electronic device 200, the first surface may face the third surface, and in the unfolded state, the third direction may be the same as the first direction.

According to various embodiments, the first housing structure 210 and the second housing structure 220 may be disposed on opposite sides about the folding axis A and may have a generally symmetrical shape with respect to the folding axis A. As will be described later, the first housing structure 210 and the second housing structure 220 have different angles or distances therebetween depending on whether the electronic device 200 is in the unfolded state, in the folded state, or in the intermediate state. According to an embodiment, unlike the first housing structure 210, the second housing structure 220 may further include the sensor area 224 in which various sensors are disposed. However, the first housing structure 210 and the second housing structure 220 may have mutually symmetrical shapes in other areas.

According to various embodiments, at least a portion of the first housing structure 210 and at least a portion of the second housing structure 220 may be formed of a metal material or a non-metal material having rigidity of a level selected to support the display 204. The at least a portion formed of the metal material may provide a ground plane of the electronic device 200, and may be electrically connected to a ground line formed on a printed circuit board.

According to various embodiments, the sensor area 224 may be formed to have a predetermined area adjacent to one corner of the second housing structure 220. However, the arrangement, shape, and size of the sensor area 224 are not limited to those in the illustrated example. For example, in another embodiment, the sensor area 224 may be provided at another corner of the second housing structure 220 or in any area between the upper and lower end corners. In an embodiment, components embedded in the electronic device 200 to perform various functions may be exposed to the front surface of the electronic device 200 through the sensor area 224 or one or more openings provided in the sensor area 224. In various embodiments, the components may include various types of sensors. The sensors may include at least one of, for example, a front camera, a receiver, or a proximity sensor.

According to various embodiments, the first rear cover 280 may be disposed on one side of the folding axis in the rear surface of the electronic device 200, and may have, for example, a substantially rectangular periphery, and the periphery may be enclosed by the first housing structure 210. Similarly, the second rear cover 290 may be disposed on the other side of the folding axis of the rear surface of the electronic device 200, and the periphery of the second rear cover 290 may be enclosed by the second housing structure 220.

According to various embodiments, the first rear cover 280 and the second rear cover 290 may have substantially symmetrical shapes about the folding axis (the axis A). However, the first rear cover 280 and the second rear cover 290 do not necessarily have mutually symmetrical shapes, and in another embodiment, the electronic device 200 may include the first rear cover 280 and the second rear cover 290 having various shapes. In a still another embodiment, the first rear cover 280 may be formed integrally with the first housing structure 210, and the second rear cover 290 may be formed integrally with the second housing structure 220.

According to various embodiments, the first rear cover 280, the second rear cover 290, the first housing structure 210, and the second housing structure 220 may define a space in which various components (e.g., a printed circuit board, or a battery) of the electronic device 200 can be arranged. According to an embodiment, one or more components may be disposed or visually exposed on the rear surface of the electronic device 200. For example, at least a portion of a sub-display may be visually exposed through a first rear area 282 of the first rear cover 280. In another embodiment, one or more components or sensors may be visually exposed through a second rear area 292 of the second rear cover 290. In various embodiments, the sensors may include a proximity sensor and/or a rear camera.

Referring to FIG. 4B, the hinge cover 230 may be disposed between the first housing structure 210 and the second housing structure 220 so as to cover internal components (e.g., the hinge structure). According to an embodiment, the hinge cover 230 may be covered by a portion of the first housing structure 210 and a portion of the second housing structure 220, or may be exposed to the outside depending on the state of the electronic device 200 (the unfolded state (flat state), the intermediate state, or the folded state).

According to an embodiment, as illustrated in FIG. 4A, when the electronic device 200 is in the unfolded state, the hinge cover 230 may not be exposed by being covered by the first housing structure 210 and the second housing structure 220. As another example, as illustrated in FIG. 4B, when the electronic device 200 is in the folded state (e.g., the fully folded state), the hinge cover 230 may be exposed to the outside between the first housing structure 210 and the second housing structure 220. As still another example, when the first housing structure 210 and the second housing structure 220 are in the intermediate state in which the first housing structure 210 and the second housing structure 220 are folded to form a predetermined angle therebetween, a portion of the hinge cover 230 may be exposed to the outside between the first housing structure 210 and the second housing structure 220. In this case, however, the exposed area may be less than that in the fully folded state. In an embodiment, the hinge cover 230 may include a curved surface.

According to various embodiments, the display 204 may be disposed on a space formed by the foldable housing. For example, the display 204 may be seated in the recess formed by the foldable housing, and may constitute most of the front surface of the electronic device 200. Accordingly, the front surface of the electronic device 200 may include the display 204 and a portion of the first housing structure 210 and a portion of the second housing structure 220, which are adjacent to the display 204. In addition, the rear surface of the electronic device 200 may include the first rear cover 280, a portion of the first housing structure 210 adjacent to the first rear cover 280, the second rear cover 290, and a portion of the second housing structure 220 adjacent the second rear cover 290.

According to various embodiments, the display 204 may be a display at least a portion of which is deformable into a flat surface or a curved surface. According to an embodiment, the display 204 may include a folding area 204c, a first area 204a disposed on one side of the folding area 204c (e.g., the left side of the folding area 204c illustrated in FIG. 4) and a second area 204b disposed on the other side of the folding area 204c (e.g., the right side of the folding area 204c illustrated in FIG. 4).

However, the area division of the display 204 illustrated in FIG. 4A is illustrative, and the display 204 may be divided into multiple areas (e.g., four or more or two areas) depending on the structures or functions thereof. For example, in the embodiment illustrated in FIG. 4A, the areas of the display 204 may be divided by the folding area 204c or the folding axis (the axis A) extending parallel to the y axis. However, in another embodiment, the areas of the display 204 may be divided based on another folding area (e.g., a folding area parallel to the x axis) or another folding axis (e.g., a folding axis parallel to the x axis). According to an embodiment, the display 204 may be coupled to or disposed adjacent to a touch-sensing circuit, a pressure sensor that is capable of measuring touch intensity (pressure), and/or a digitizer that detects a magnetic field-type stylus pen.

According to various embodiments, the first area 204a and the second area 204b may have generally symmetrical shapes about the folding area 204c. However, unlike the first area 204a, the second area 204b may include a notch cut due to the presence of the sensor area 224, but may have a shape symmetrical to the first area 204a in the area other than the sensor area 224. In other words, the first area 204a and the second area 204b may include mutually symmetrical portions and mutually asymmetrical portions.

Hereinafter, the operations of the first housing structure 210 and the second housing structure 220 according to the state of the electronic device 200 (e.g., the unfolded state, the folded state, or the intermediate state) and respective areas of the display 204 will be described.

According to various embodiments, when the electronic device 200 is in the unfolded state (e.g., FIG. 4A), the first housing structure 210 and the second housing structure 220 may be disposed to form an angle of 180 degrees therebetween and to be oriented in the same direction. The surface of the first area 204a and the surface of the second area 204b of the display 204 form 180 degrees relative to each other, and may face the same direction (e.g., the front direction of the electronic device). The folding area 204c may form the same plane as the first area 204a and the second area 204b.

According to various embodiments, when the electronic device 200 is in the folded state (e.g., FIG. 4B), the first housing structure 210 and the second housing structure 220 may be disposed to face each other. The surface of the first area 204a and the surface of the second area 204b of the display 204 may face each other while forming a narrow angle (e.g., an angle between 0 and 10 degrees) relative to each other. At least a portion of the folding area 204c may be formed in a curved surface having a predetermined curvature.

According to various embodiments, when the electronic device 200 is in the intermediate state, the first housing structure 210 and the second housing structure 220 may be disposed to form a predetermined angle relative to each other. The surface of the first area 204a and the surface of the second area 204b of the display 204 may form an angle larger than that in the folded state and smaller than that in the unfolded state. At least a portion of the folding area 204c may be formed as a curved surface having a predetermined curvature, and the curvature in this case may be smaller than that in the folded state.

Figure 5:
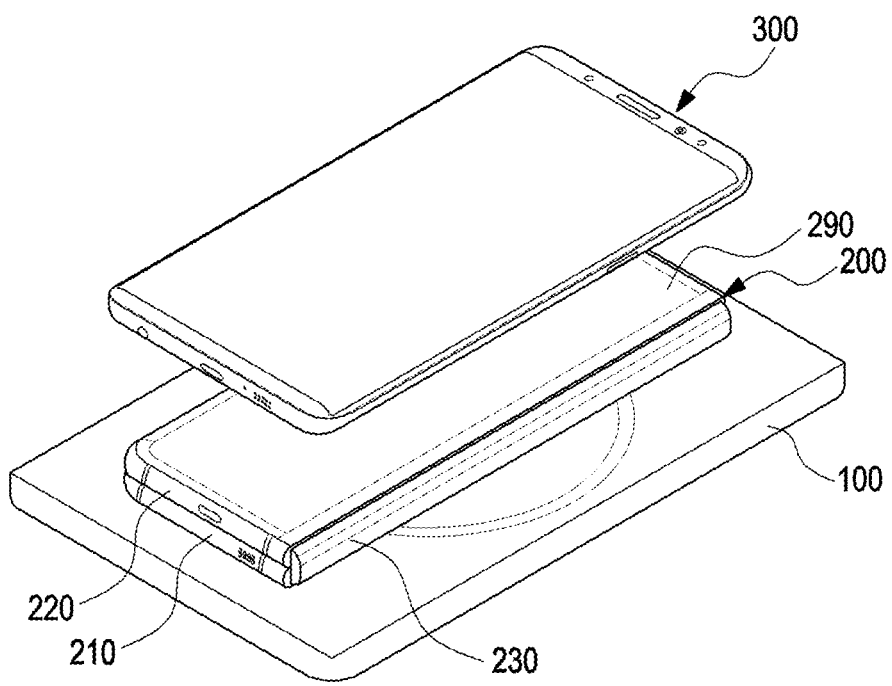
FIG. 5 illustrates a view of a use aspect of a wireless power transmission device and electronic devices according to various embodiments.
Figure 6A:
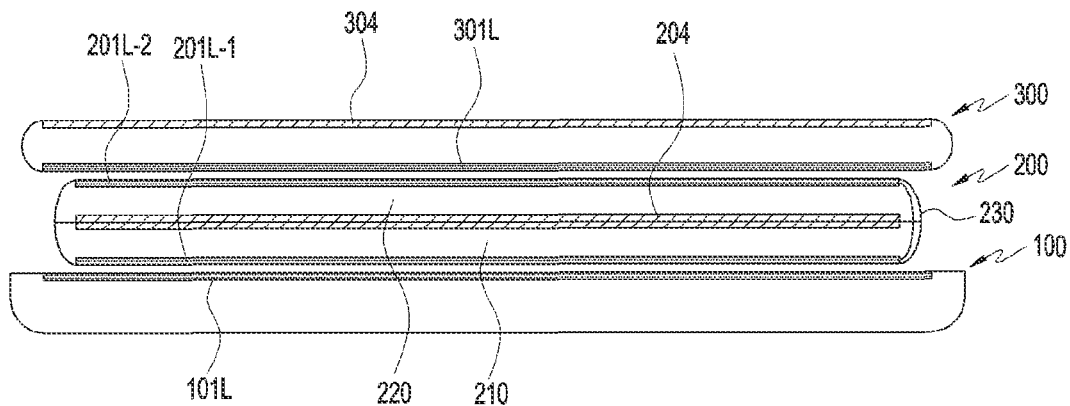
FIG. 6A illustrates a side view of a use aspect of a wireless power transmission device and electronic devices according to various embodiments.
Figure 6B:
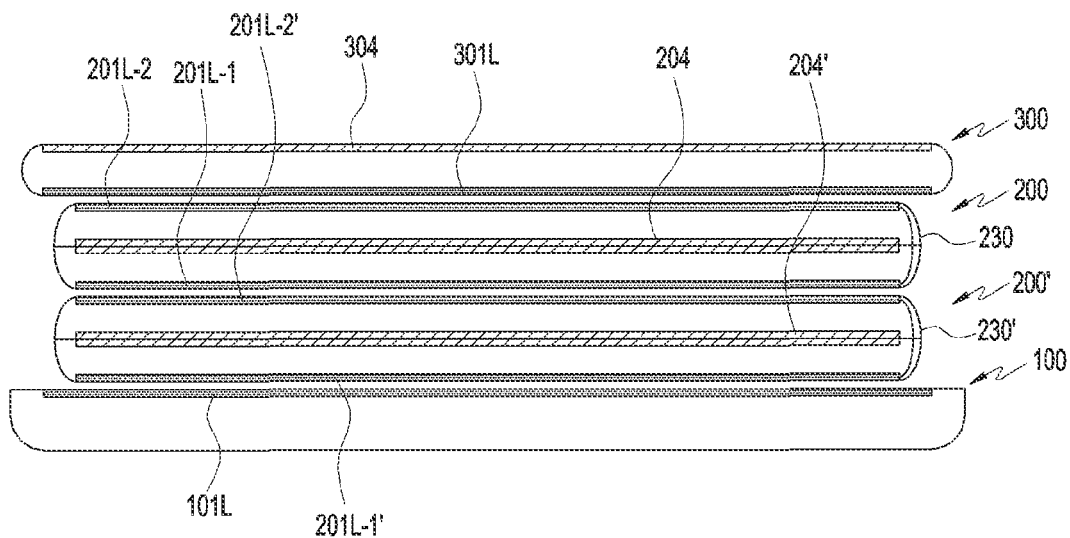
FIG. 6B illustrates a side view of a use aspect of a wireless power transmission device and electronic devices according to another embodiment.
Figure 7:
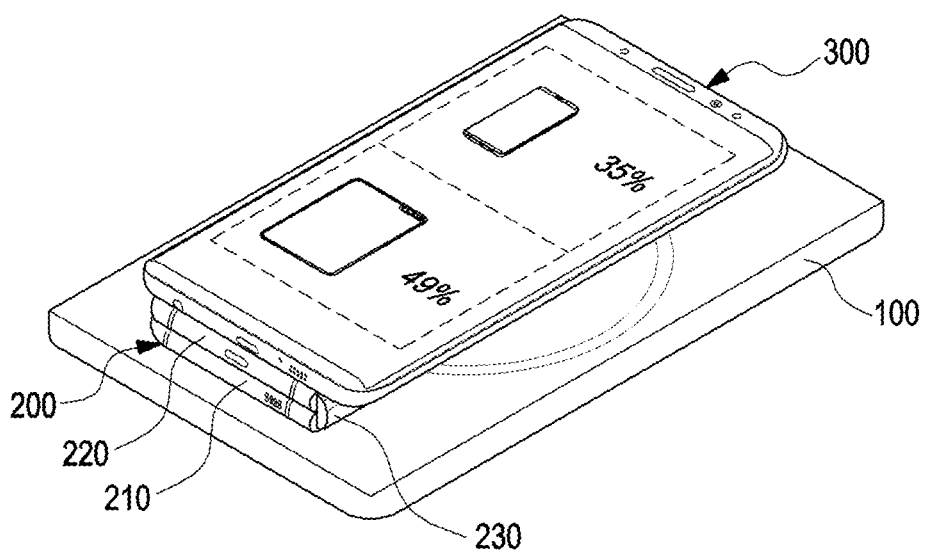
FIG. 7 illustrates a view of the state in which electronic devices are simultaneously charged according to various embodiments.

FIG. 5 illustrates a view of a use aspect of a wireless power transmission device 100 and electronic devices 200 and 300 according to various embodiments. FIG. 6A illustrates a side view of a use aspect of a wireless power transmission device 100 and electronic devices 200 and 300 according to various embodiments. FIG. 6B illustrates a side view of a use aspect of a wireless power transmission device 100 and electronic devices 200 and 300 according to another embodiment. FIG. 7 illustrates a view of the state in which electronic devices 200 and 300 are simultaneously charged according to various embodiments. In the following embodiments, a method of simultaneously charging multiple electronic devices 200 and 300 may be illustrated.

For convenience of description, an electronic device 200 may be referred to as a first electronic device, and an external electronic device 300 may be referred to as a second electronic device. Although the figure illustrates that two different electronic devices are provided except for a wireless power transmission device 100, various embodiments are not necessarily limited thereto, and may also include an embodiment of simultaneously charging three or more electronic devices. In addition, the case where two or more identical electronic devices are simultaneously charged may be included. For example, in the state in which two first electronic devices 200 are stacked on one another, the second electronic devices may be stacked to simultaneously charge three electronic devices.

According to various embodiments, when the second electronic device 300 is placed on the first electronic device 200, even if the first electronic device 200 is provided with a circuit for power transmission/reception, wireless charging efficiency to the second electronic device 300 may be reduced by an electronic component (e.g., the display 204) provided in the first electronic device 200. For example, when the second electronic device 300 is placed on the display 204 of the first electronic device 200 in the state in which the first electronic device 200 is unfolded, charging of the first electronic device 200 using the wireless power transmission device 100 may be performed without abnormality, but charging of the second electronic device 300 using the first electronic device 200 may have very low efficiency.

In contrast, referring to FIGS. 5 and 6A together, when the second electronic device 300 is placed on the first electronic device 200 in the state in which the first electronic device 200 is folded, charging of the second electronic device 300 may be performed in the state in which a decrease in charging efficiency is minimized by reducing interference, caused by an electronic component (e.g., the display 204) included in the first electronic device 200, by a power transmission/reception circuit provided in the first electronic device 200. For example, when the first electronic device 200 is placed on the charging pad of the wireless charging device 100 in the state in which the first electronic device 200 is completely folded, and the third electronic device 300 is placed on the second rear cover 290 of the second housing 220 of the first electronic device 200, a decrease in charging efficiency can be minimized and a wireless charging function for the two electronic devices can be performed.

As another example, in the case where radio wave interference through any one of the surfaces facing outwards in the state in which the first electronic device 200 is folded is small, a decrease in charging efficiency can be minimized when the second electronic device 300 is charged in the state in which a surface having small radio interference is facing upwards. When a sub-display is disposed on the first rear cover 280 of the first electronic device 200 as illustrated in FIG. 5, it may be advantageous if the second electronic device 300 is disposed on the second rear cover 290.

As described above, according to various embodiments, the charging function of the second electronic device 300 can be performed in the state in which a decrease in mutual charging efficiency is minimized while charging the first electronic device 200.

According to various embodiments, the first electronic device 200 may include a foldable electronic device including a first housing structure, a second housing, and a hinge structure connecting the first and second housing structures, or a detachable electronic device including a first housing structure and a second housing structure, each of which includes a magnetic body such that the first and second housing structures are detachably attached to each other using the magnetic bodies. For example, in the detachable electronic device, mutual side portions of two or more different housings are disposed adjacent to each other, and magnetic bodies having a designated pattern are disposed along the longitudinal direction of side surfaces of the housings such that two or more different housings are rotatably connected to each other.

Assuming that the first electronic device 200 is, for example, a foldable electronic device, a first wireless charger for performing wireless charging function in relation to an external electronic device (e.g., a wireless power transmission device 100) may be disposed in the first housing 210, and a second wireless charger for performing a wireless charging function in relation to an external electronic device (e.g., the second electronic device 300) may be disposed in the second housing 220. Here, the first wireless charger and the second wireless charger may be wireless charging means including at least one of a coil, a matching circuit, a rectifying circuit, an adjustment circuit, a battery, a control circuit, and a communication circuit. Since the configuration of each of the coil, the matching circuit, the rectifying circuit, the adjustment circuit, the battery, and the communication circuit has been described in detail in the embodiment of FIG. 3, a description thereof will be omitted. According to one embodiment, the first wireless charger may include a wireless reception resonator for receiving power from the external wireless power transmission device 100, and the second wireless charger may include a wireless transmission resonator for supplying power to another external electronic device (e.g., the second electronic device 300).

The control circuit (e.g., the control circuit 202 in FIG. 3) included in the first electronic device 200 may activate the wireless charging function (performance of the wireless power transmission/reception function) of the first electronic device 200. According to an embodiment, the control circuit may include a first wireless charging unit and a first charging unit to charge the second electronic device 300 in the state in which the first housing structure 210 and the second housing structure 220 are folded to face each other.

To this end, for at least one of the first wireless charger or the second wireless charger, the control circuit may receive at least one of the state information, the charging state information, or the surrounding environment information of the first electronic device 200. On the basis of at least one of the received state information, charging state information, or surrounding environment information of the electronic device, the reception function may be converted into the transmission function or the transmission function may be converted into the reception function. The control circuit 202 (e.g., the control circuit 202 in FIG. 3) may request one or more predetermined conditions for performing a wireless power transmission function from the first electronic device 200 to the second electronic device 300. According to an embodiment, the predetermined conditions may include the state in which a surface having small radio wave interference faces upwards when the radio wave interference through any one of the surfaces facing outwards is small in the state in which the first electronic is folded. For example, the control circuit may identify which surface of the electronic device faces upwards through a gyro sensor or the like included in the electronic device. By using the fact that the charging efficiency is high when the surface having small radio wave interference faces upwards, the wireless power transmission function from the first electronic device 200 to the second electronic device 300 may be performed. According to another embodiment, the predetermined conditions may include the state in which the first electronic device 200 itself is being charged. Here, the charging of the first electronic device 200 may be irrespective of wireless charging or wired charging. For example, the predetermined conditions may include the state in which at least one of the first wireless charger or the second wireless charger included in the first electronic device 200 is supplied with power from an external wireless power transmission device or is supplied with power from an external DC power supply connected to the first electronic device 200. According to another embodiment, the predetermined conditions may include the state in which the first electronic device 200 faces the second electronic device 300 through at least an outer surface among the second surface or the fourth surface facing outwards when the first electronic device 200 is folded. The predetermined conditions may include the state in which the second electronic device 300 approaches the first electronic device 200 by a predetermined distance. When at least one of the predetermined conditions of the above-mentioned embodiments is satisfied, the control circuit may cause the first electronic device 200 to perform the wireless power transmission function to the second electronic device 300. However, it is not necessarily limited to the above-mentioned predetermined conditions, and various other embodiments may be possible.

In addition, the control circuit (e.g., the control circuit 202 in FIG. 3) may perform the function of charging the second electronic device 300 using the first electronic device 200 on the basis of the charging state of the first electronic device 200 and the charging state of the second electronic device 300. For example, when the remaining battery capacity of the second electronic device 300 is lower than the remaining battery capacity of the electronic device, charging of the second electronic device may be performed at a charging ratio higher than the charging ratio of the first electronic device 200.

According to some embodiments, signals, exchanged in the operation in which the first electronic device 200 receives power from the wireless power transmission device 100, and signals, exchanged in the operation in which the second electronic device 300 receives power from the first electronic device 200, may interfere with each other, thereby causing deterioration of charging efficiency between the electronic devices. In order to prevent this, the control circuit (e.g., the control circuit 202 in FIG. 3) may perform control such that the transmission or reception function of the first wireless charger during simultaneous charging of the first wireless charger and the second wireless charger is performed according to a first frequency and the transmission or reception function of the second wireless charger is performed according to a second frequency.

Referring to FIG. 6A, the wireless charging function may be performed in the state in which the coil 101L provided in the wireless power transmission device 100 faces the first coil 201L-1 of the electronic device 200 and the second coil 201L-2 of the electronic device 200 faces the coil 301L of another electronic device 300. As described above, the electronic devices 200 and 300 can be simultaneously charged in a wireless manner in the state in which three or more electronic devices are provided. For example, as illustrated in FIG. 6B, three or more electronic devices 200, 200', and 300 may be stacked on one another. Here, the electronic device 200' may receive power from the wireless power transmission device 100, and may transmit wireless power to another electronic device 200. In addition, the electronic device 200 may receive power from the electronic device 200', and may transmit wireless power to another electronic device 300. In the state in which three or more electronic devices 200, 200', and 300 are stacked, an electronic that simultaneously performs a wireless power transmission and a wireless reception function may correspond to a foldable electronic device having coils in two different housings, respectively. As described above, according to various embodiments, it is possible to simultaneously charge three or more electronic devices. The arrangement between the coils within the electronic devices 200 and 200' will be described in more detail below with reference to FIG. 10.

Referring to FIG. 7, in the state in which the second electronic device 300 is placed on the second rear cover 290 of the first electronic device 200, the charging state information of the first electronic device 200 charged by the wireless power transmission device 100 may be difficult to identify because the first electronic device 200 is folded and the display 204 is not visible to the outside. According to an embodiment, as illustrated in FIG. 7, it may be possible to acquire charging state information using the display 304 of the second electronic device 300. The acquisition of the charging state information using the display 304 of the second electronic device 300 will be described in detail below with reference to FIG. 13.

Figure 8:
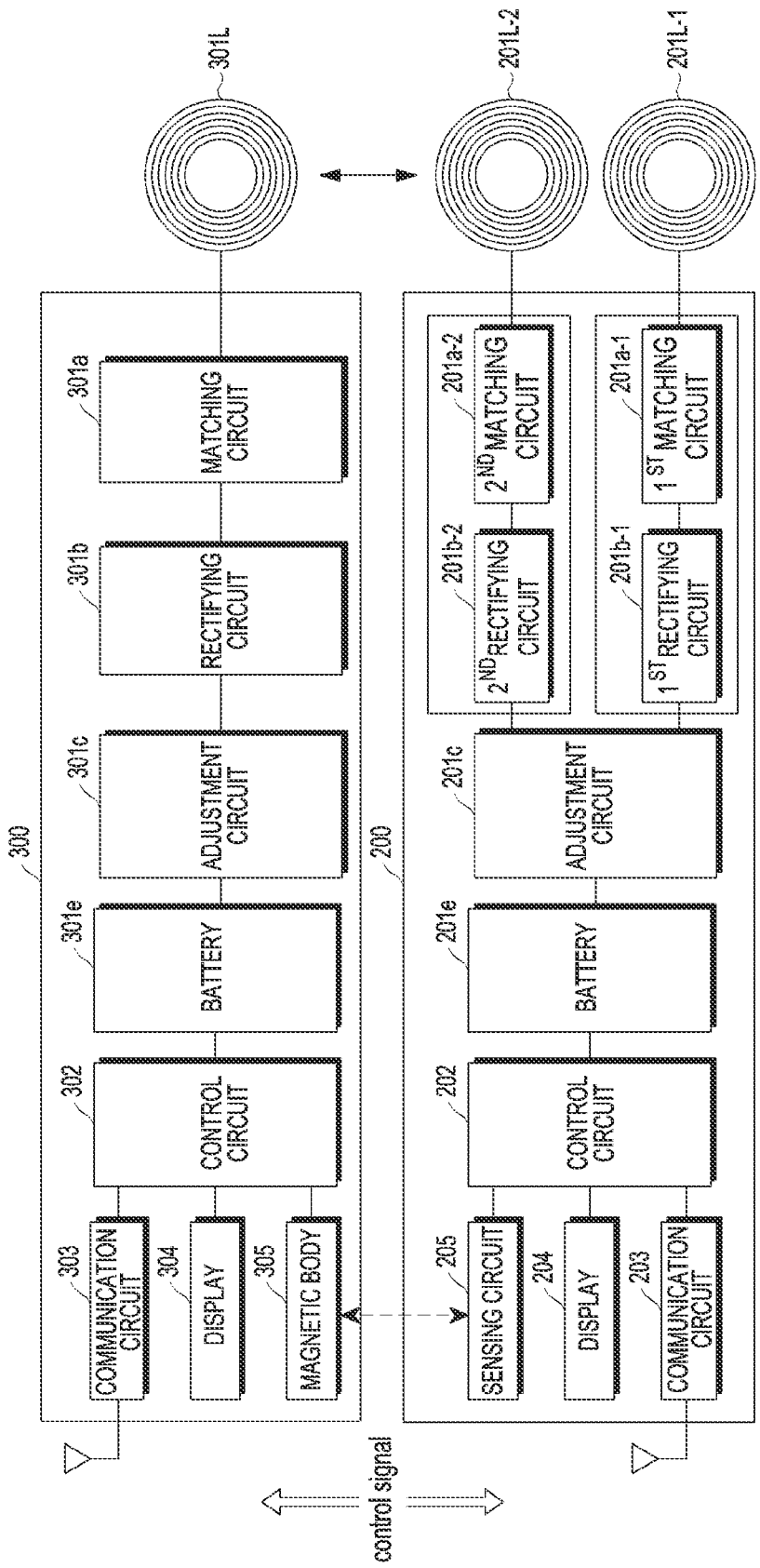
FIG. 8 illustrates a block diagram of electronic devices for wireless charging according to an embodiment different from that of FIG. 3.
Figure 9:
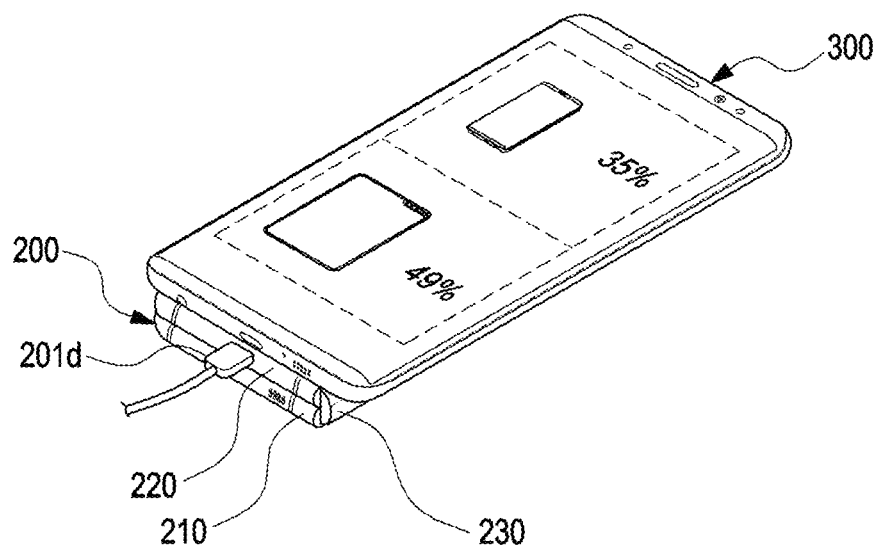
FIG. 9 illustrates a view of the state in which electronic devices are simultaneously charged according to an embodiment different from that of FIG. 7.

FIG. 8 illustrates a block diagram of electronic devices 200 and 300 for wireless charging according to an embodiment different from that of FIG. 3. FIG. 9 illustrates a view of the state in which electronic devices 200 and 300 are simultaneously charged according to an embodiment different from that of FIG. 7. In describing the embodiments of FIGS. 8 and 9, a description overlapping the foregoing description will be omitted.

FIGS. 8 and 9 illustrate a wireless charging method different from those of the embodiments described above with reference to FIGS. 3 to 7. According to the embodiments illustrated in FIGS. 3 to 7, it is illustrated that two electronic devices are simultaneously charged by providing at least one wireless power transmission device 100, but as illustrated in FIGS. 8 and 9, wireless charging between multiple electronic devices may be performed without separately providing a power transmission device.

According to an embodiment, the second electronic device 300 may be charged, using the first electronic device 200 as a kind of wireless power transmission device. For example, the second electronic device 300 may be wirelessly charged, using the wireless power transmission circuit (e.g., the second wireless charger) of the first electronic device 200 described with reference to FIG. 3. In this case, according to an embodiment, the wireless power reception circuit (e.g., the first wireless charger) of the first electronic device 200 may have a pause (or standby) state. According to another embodiment, when the wireless power reception circuit (e.g., the first wireless charger) is convertible to perform the function of the wireless power transmission circuit, charging of another electronic device 300 may be enabled, using two wireless power transmission circuits (the first wireless charger and the second wireless charger).

Referring to FIGS. 8 and 9 together, the first electronic device 200 may charge the second electronic device 300 using its own power, but may function as a wireless power transmission device to charge another electronic device 300 in the state of receiving DC power from an external power supply 201d.

Figure 10:
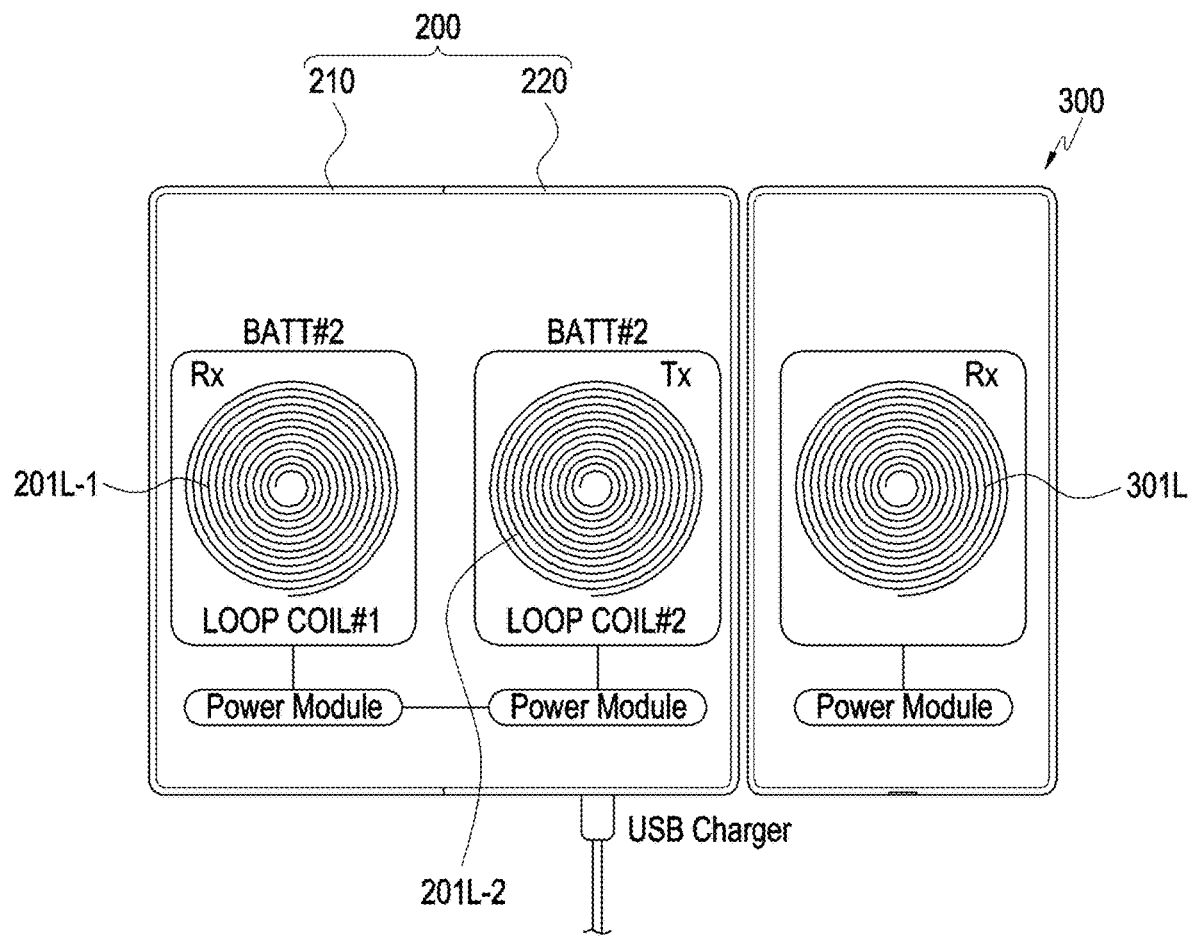
FIG. 10 illustrates a view of an operation aspect of wireless power coils of electronic devices according to various embodiments.

FIG. 10 illustrates a view of an operation aspect of wireless power coils of electronic devices 200 and 300 according to various embodiments.

In the electronic device 200 and 300 according to the embodiments illustrated in FIGS. 3 to 10, the first electronic device 200 may include different charging coils 201L-1 and 201L-2 provided in at least two housings 210 and 220, respectively, and the wireless charging between the electronic devices 200 and 300 may be performed using a phenomenon in which energy is generated by induction or resonance occurring by causing a change in the magnetic field of the coil 301L provided in the second electronic device 300, using the charging coils 201L-1 and 201L-2.

According to an embodiment, the coils 201L-1 and 201L-2 included in the first electronic device 200 may be disposed at respective positions of the two housings 210 and 220 that are opposite to each other about a hinge portion provided in the first electronic device 200. According to an embodiment, the coils 201L-1 and 201L-2 included in the first electronic device 200 may be electrically connected to each other. For example, one end of the first coil 201L-1 and one end the second coil 201L-2 may be connected to each other by wire. Here, the connection between one component and another component may include an indirect connection as well as a direct connection. For example, as illustrated in FIG. 10, the first coil 201L-1 and the second coil 201L-2 may be indirectly connected to each other through respective power modules (e.g., control circuits).

Respective coils illustrated in the figure may be independently operated by separate power control modules (e.g., control circuits), and the like, and may be switchable depending on whether or not the electronic devices 200 and 300 are connected to another external device, a power state, the mutually stacked state of the devices 200 and 300, or the like.

Figure 11:
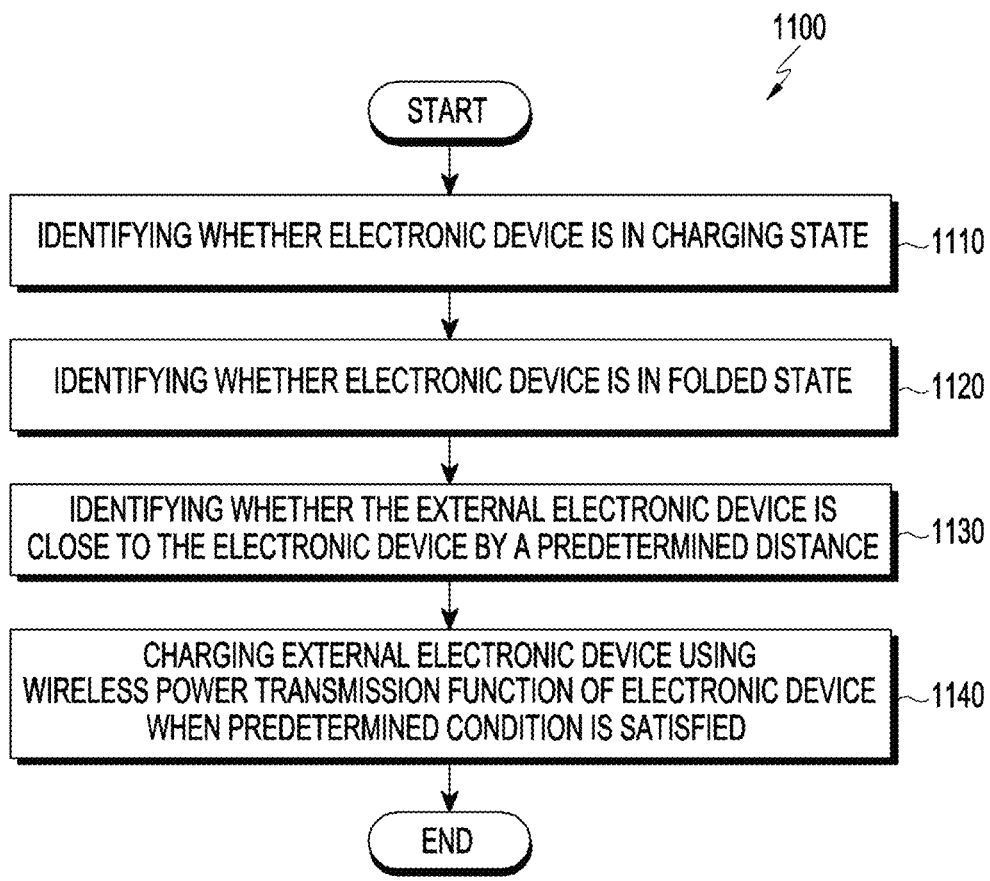
FIG. 11 illustrates an operation flowchart for simultaneous charging of multiple electronic devices according to various embodiments.

FIG. 11 is an operation flowchart 1100 illustrating a method of simultaneously charging multiple electronic devices.

Referring to FIG. 11, in the case where an electronic device capable of performing a wireless power reception function and a wireless power transmission function with respect to an external electronic device (e.g., the first electronic device 200 in FIG. 3) and a control circuit (e.g., the control circuit 202 in FIG. 3) for controlling the electronic device are included, the method of simultaneously charging multiple electronic devices may include: an operation of identifying, by the control circuit, whether the electronic device is in a charging state (1110); an operation of identifying, by the control circuit, whether the electronic device is in a folded state (1120); an operation of identifying, by the control circuit, whether the external electronic device in the state of approaching the electronic device to a predetermined distance from the electronic device (1130); and an operation of charging, by the control circuit, the external electronic device using the wireless power transmission function of the electronic device when a predetermined condition is satisfied (1140).

Figure 12:
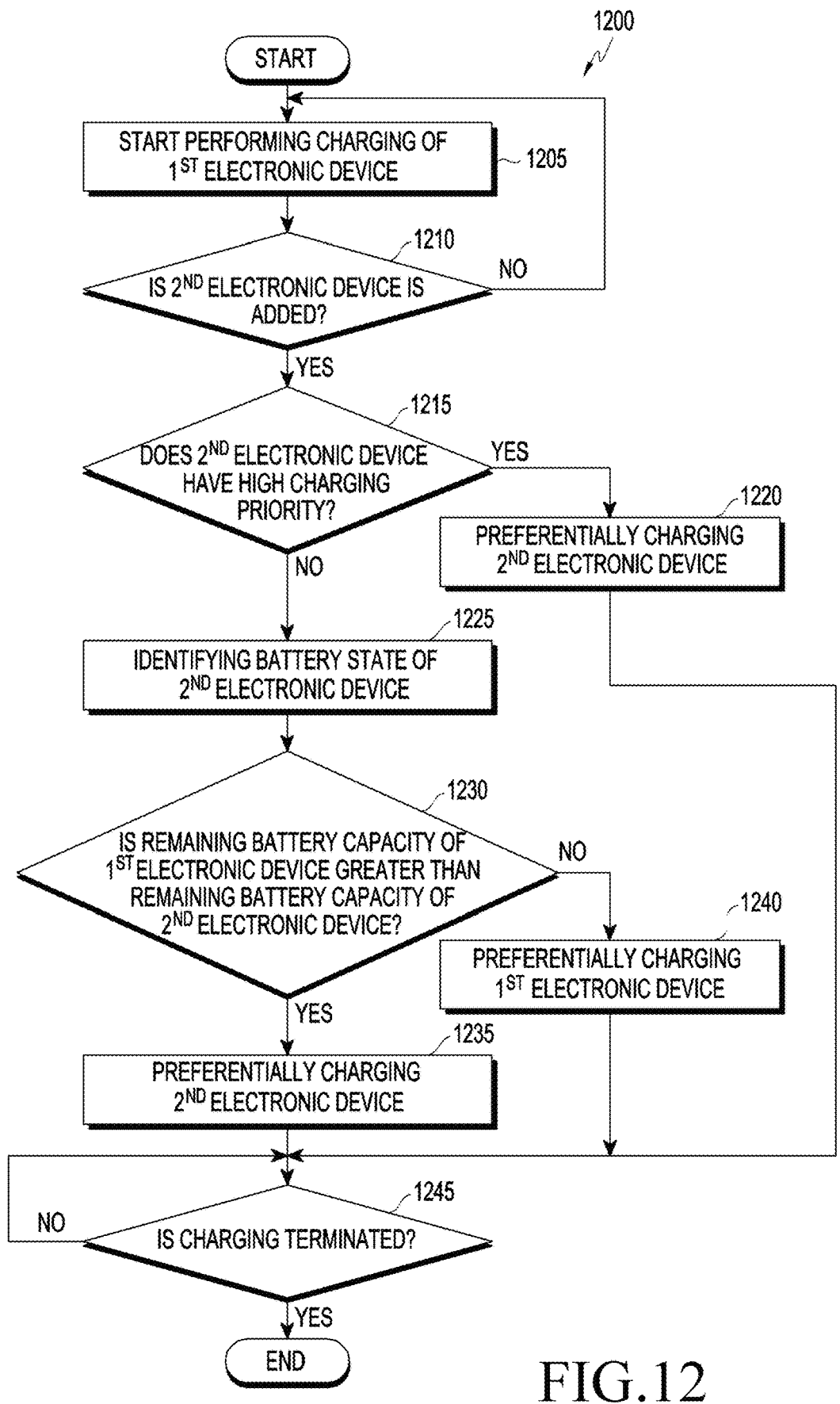
FIG. 12 illustrates an operation flowchart for controlling simultaneous charging in a first electronic device according to various embodiments.

FIG. 12 illustrates an operation flowchart 1200 for controlling simultaneous charging in a first electronic device according to various embodiments.

Referring to FIG. 12, an operation method may include operations 1205 to 1245. Each step/operation of the operation method may be performed by at least one of electronic devices (e.g., the first electronic device 200 and at least one processor of the first electronic device 200). According to an embodiment, at least one of operations 1205 to 1245 may be omitted, the order of some operations may be changed, or other operations may be added.

Referring to FIG. 12, when the first electronic device 200 is placed on the wireless power transmission device 100, charging of the first electronic device 200 may be started by a signal received from the wireless power transmission device 100, and charging for the first electronic device 200 in operation 1205 may be performed through connection with the wireless power transmission device 100. Alternatively, the first electronic device 200 may perform charging by being electrically connected when an external charger that supplies power for charging a battery is inserted into a connection port in the first electronic device 200.

In operation 1210, it is possible to identify whether the second electronic device 300 is added while or before charging of the first electronic device 200 is performed. For example, when the second electronic device 300 is stacked on the first electronic device 200, it may be determined that the second electronic device 300 for charging is added. Subsequently, in operation 1215, whether the second electronic device 300 is an electronic device having a high charging priority may be identified. According to an embodiment, it is possible to identify which electronic device the second electronic device is based on the type of the second electronic device 300. For example, unlike electronic devices that have a display of a predetermined size or larger, such as mobile phones, smartphones, foldable smartphones, accessory devices, such as smart watches, wireless earphones, and smart bands, a higher charging priority may be assigned for portability. For example, in the case of an accessory device, when a user places the accessory device on the first electronic device 200, considering that there is an intention to charge the accessory device immediately, the first electronic device 200 may perform control such that the accessory device can be preferentially charged regardless of the remaining battery capacities of the first electronic device 200 and the accessory device.

Accordingly, when the second electronic device is determined to have a high charging priority on the basis of the type of the second electronic device 300 in operation 1215, the first electronic device 200 preferentially charges the second electronic device 300 in operation 1220. According to an embodiment, when the first electronic device 200 is being charged, the charging ratio of the first electronic device 200 may be lowered, and charging of the second electronic device 300 may be performed. For example, charging may be performed by setting the charging ratios of the first electronic device 200 and the second electronic device 300 differently, for example, at 3:7, and when the remaining battery capacities of the two electronic devices 200 and 300 become the same during the charging process, the charging ratios of the two electronic devices 200 and 300 may be controlled to be the same.

When the charging priority of the second electronic device 300 is not high in operation 1215, the first electronic device 200 may identify the battery state of the second electronic device 300 in operation 1225. According to an embodiment, the remaining battery capacity of the second electronic device 300 may be checked, and the remaining battery capacity of the first electronic device 200 may also be checked.

On the basis of the result of identifying the battery state in operation 1230, the first electronic device 200 may identify whether the remaining battery capacity of the first electronic device 200 is greater than the remaining battery capacity of the second electronic device 300. When the remaining battery capacity of the first electronic device 200 is greater than the remaining battery capacity of the second electronic device 300, the second electronic device 300 may be preferentially charged in operation 1235. For example, charging may be performed by making the charging ratio of the second electronic device 300 higher than the charging ratio of the first electronic device 200.

In contrast, when the remaining battery capacity of the first electronic device 200 is smaller than the remaining battery capacity of the second electronic device 300, the first electronic device 200 may be preferentially charged in operation 1240. For example, charging may be performed by making the charging ratio of the first electronic device 200 higher than the charging ratio of the second electronic device 300. If the remaining battery capacities of the two electronic devices 200 and 300 become the same during the simultaneous charging process, the charging ratios of the two electronic devices 200 and 300 may be controlled to be the same. Meanwhile, the charging ratios may be controlled to be the same, but alternatively, even during simultaneous charging, charging of any one of the electronic devices can be more quickly completed depending on a user's selection. Accordingly, during the simultaneous charging, a notification window may be output on the screen of the second electronic device 300 placed on the top of the first electronic device 200 to enable setting change such as change of charging priority. For example, even during simultaneous charging, charging of the first electronic device 200 may be completed faster than the second electronic device 300 depending on a user's selection.

As described above, in the state in which simultaneous charging of the first electronic device 200 and the second electronic device 300 is being performed, whether charging is terminated may be identified in operation 1245. For example, the simultaneous charging operation may be continuously performed unless the situation in which charging is terminated, such as when charging is completed or when any one electronic device is removed from the wireless power transmission device 100, occurs.

Figure 13:
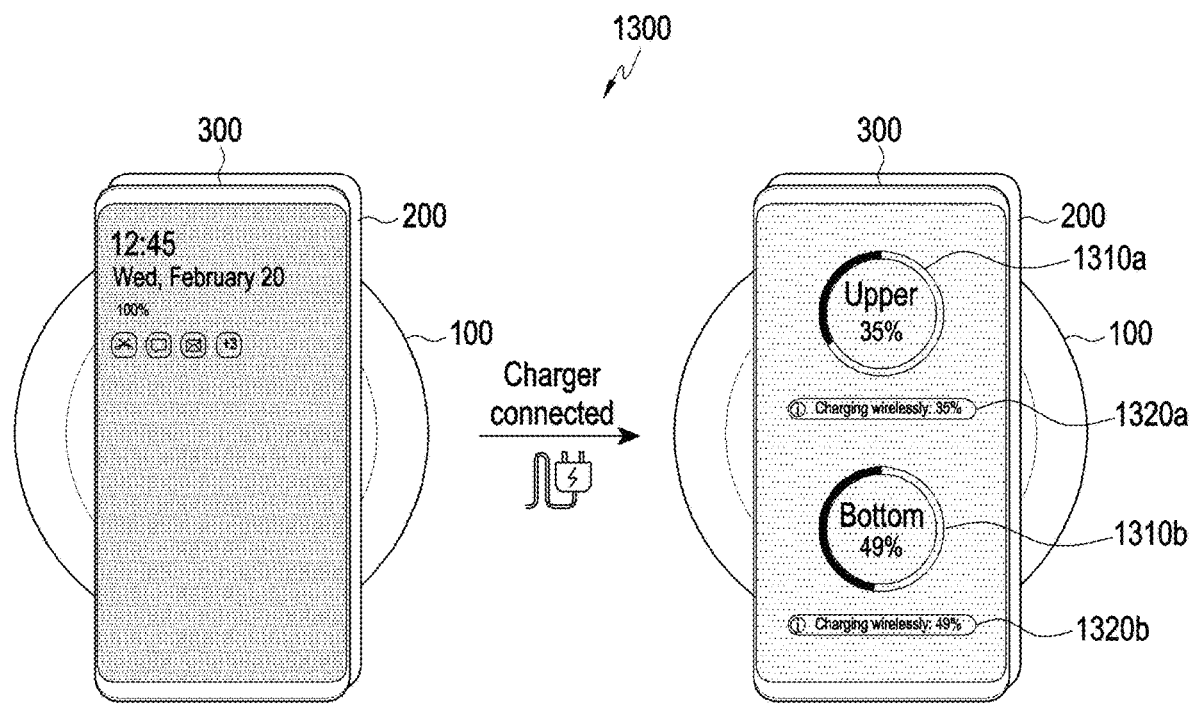
FIG. 13 illustrates an exemplary screen view for notifying of a charging situation during simultaneous charging according to various embodiments.

FIG. 13 illustrates an exemplary screen view 1300 for notifying of a charging situation during simultaneous charging according to various embodiments.

FIG. 13 illustrates a method in which the first electronic device 200 supplies power to the second electronic device 300. As illustrated in FIG. 13, when the second electronic device 300 is superimposed on the first electronic device 200 in the state in which the first electronic device 200 is placed on the wireless power transmission device 100, the first electronic device 200 may serve as a wireless power transmission device for the second electronic device 300. The first electronic device 200 performs charging for the second electronic device 300 through the wireless power charging method with the second electronic device 300 placed on the first electronic device 200 while performing charging through the wireless charging method with the wireless power transmission device 100.

According to an embodiment, the first electronic device 200 may be a foldable electronic device including a battery, and the second electronic device 300 may include various electronic devices such as a bar-type smartphone. Alternatively, both the first electronic device 200 and the second electronic device 300 may be foldable electronic devices.

For example, when the second electronic device 300 is a foldable electronic device like the first electronic device 200, the second electronic device 300 may serve to receive power for charging from the first electronic device 200. In addition, when another third electronic device is placed on the second electronic device 300, the second electronic device 300 may also serve to supply power to the third electronic device. As described above, more electronic devices may be stacked depending on the type of the second electronic device 300 placed on the first electronic device 200. For example, when the second electronic device 300 also has the same configuration as the first electronic device 200 in which, with reference to the folding portion of the first electronic device 200 of the foldable type, a first coil 201L-1 (e.g., a TX loop coil) is disposed on the first surface and a second coil 201L-2 (e.g., an RX loop coil) is disposed on the second surface, in the state in which a third electronic device is stacked on the second electronic device 300, wireless charging of all the first electronic device 200, the second electronic device 300, and the third electronic device may be possible. In the case of a foldable electronic device having directionality as described above, stacking is possible, and wireless charging of each electronic device may be possible.

As illustrated in FIG. 13, when two or more electronic devices are stacked on the wireless power transmission device 100, the second electronic device 300 placed at the top may provide information related to battery charging. According to an embodiment, when simultaneously charging the first electronic device 200 and the second electronic device 300, the electronic device placed at the top, for example, the second electronic device 300, provides information related to simultaneous charging. For example, the information related to simultaneous charging may be provided through a visual notification, an audible notification, and/or a tactile notification. For example, the notifications may include an image, icon, text, warning, and/or voice indicating the state of simultaneous charging. According to an embodiment, a notification may be provided on the display of the second electronic device 300.

As illustrated in FIG. 13, a screen informing a charging state when charging is started in the state in which the second electronic device 300 is superimposed on the first electronic device 200 is displayed on the display of the second electronic device 300 located at the top. For example, when the first electronic device 200 and the second electronic device 300 are simultaneously placed on the wireless power transmission device 100 or the first electronic device 200 is on the wireless power transmission device 100 and then the second electronic device 300 is placed on the first electronic device 200, the first electronic device 200 may transmit a signal requesting wireless charging to the wireless power transmission device 100. In response to this, the first electronic device 200 and the wireless power transmission device 100 may be connected when the first electronic device 200 receives a response from the wireless power transmission device 100, and wireless charging of the first electronic device 200 may started. Subsequently, when the second electronic device 300 is additionally placed on the first electronic device 200 during the charging of the first electronic device 200, the second electronic device 300 may also be charged at the same time. At this time, the second electronic device 300 may transmit a signal requesting wireless charging to the first electronic device 200, and when receiving a response thereto from the first electronic device 200, the first electronic device 200 and the second electronic device 300 may be connected to perform wireless charging.

As described above, when simultaneous charging of the first electronic device 200 and the second electronic device 300 is started, charging-related graphic objects 1310*a* and 1310*b* and texts 1320*a* and 1320*b* indicating charging progress situation may be displayed on the screen of the second electronic device 300 located at the top. According to an embodiment, the charging situation for each of the first electronic device 200 and the second electronic device 300 may be displayed in one screen of the second electronic device 300 in relation to simultaneous charging. For example, depending on positions at which the first electronic device 200 and the second electronic device 300 are placed, a graphic object 1310*a* indicating that the second electronic device 300 located at the top is being charged and a graphic object 1310*b* indicating that the first electronic device 200 located at the bottom is being charged may be displayed at predetermined first and second positions on the screen of the second electronic device 300, respectively. The graphic objects 1310*a* and 1310*b* in FIG. 13 may be various types of objects, such as images and icons, such that the stacked positions or types of respective electronic devices can be identified.

Figure 14:
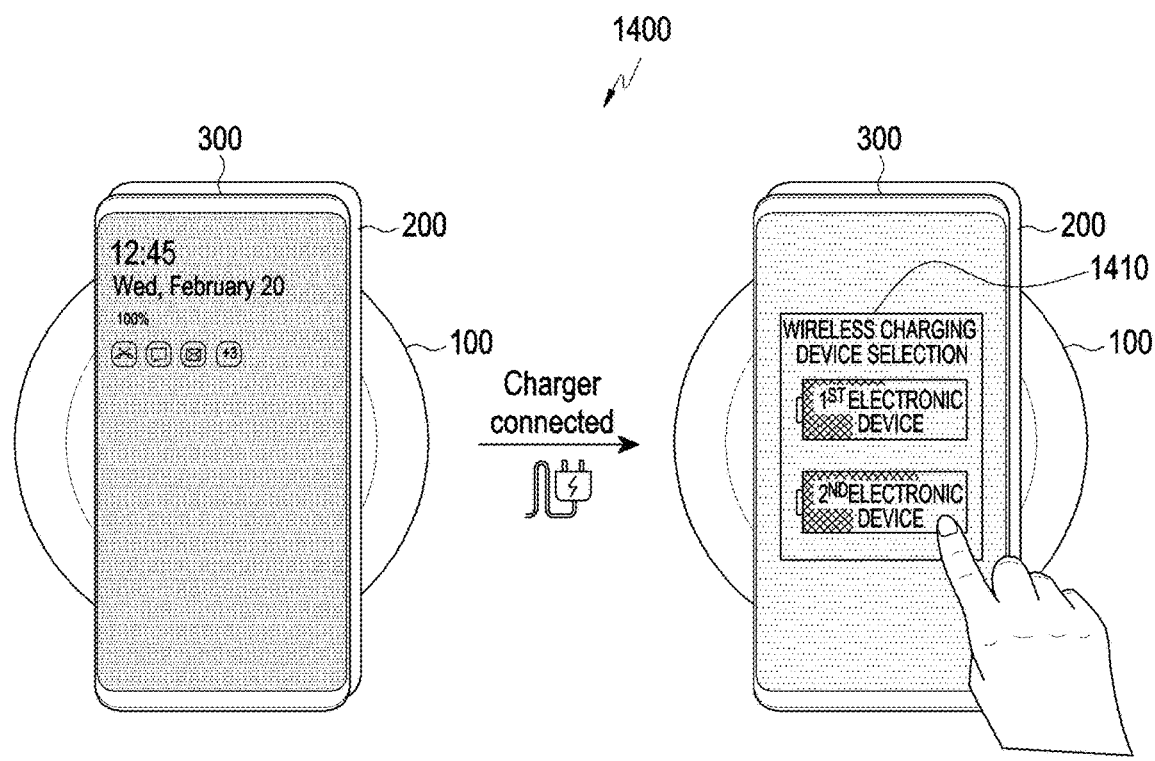
FIG. 14 illustrates an exemplary selection screen view for selecting charging targets during simultaneous charging according to various embodiments.

FIG. 14 illustrates an exemplary selection screen view 1400 for selecting charging targets during simultaneous charging according to various embodiments.

According to an embodiment, when the first electronic device 200 and the second electronic device 300 are simultaneously charged, the charging priority may be determined on the basis of at least one of the type and the remaining battery capacity of the second electronic device 300 placed on the first electronic device 200. For example, when the second electronic device 300 is an accessory-type device such as a smart watch, the charging order for the second electronic device 300 may be the highest priority. Accordingly, in the situation in which simultaneous charging of the first electronic device 200 and the second electronic device 300 is required, the second electronic device 300 is charged at a higher charging ratio than the first electronic device 200. Accordingly, the second electronic device 300 may be charged faster than the first electronic device 200.

In addition, among the first electronic device 200 and the second electronic device 300, charging may be performed at a higher charging ratio for an electronic device having a smaller remaining battery capacity depending on the remaining battery capacity of each of the electronic devices 200 and 300. The charging priority may be determined in consideration of various charging situations. Alternatively, as illustrated in FIG. 14, when simultaneous charging of the first electronic device 200 and the second electronic device 300 is started, a notification window 1410 may be displayed on the screen of the second electronic device 300 located at the top, and then the user may select one desired to be charged faster. For example, even when the first electronic device 200 is a foldable-type smartphone, the second electronic device 300 is a different type of smartphone, and the remaining battery capacity of the first electronic device 200 is greater than the remaining battery capacity of the second electronic device 300, a screen for selecting a desired device may be displayed during simultaneous charging in consideration of the case where the user wants to charge and use the foldable-type smartphone first.

Figure 15:
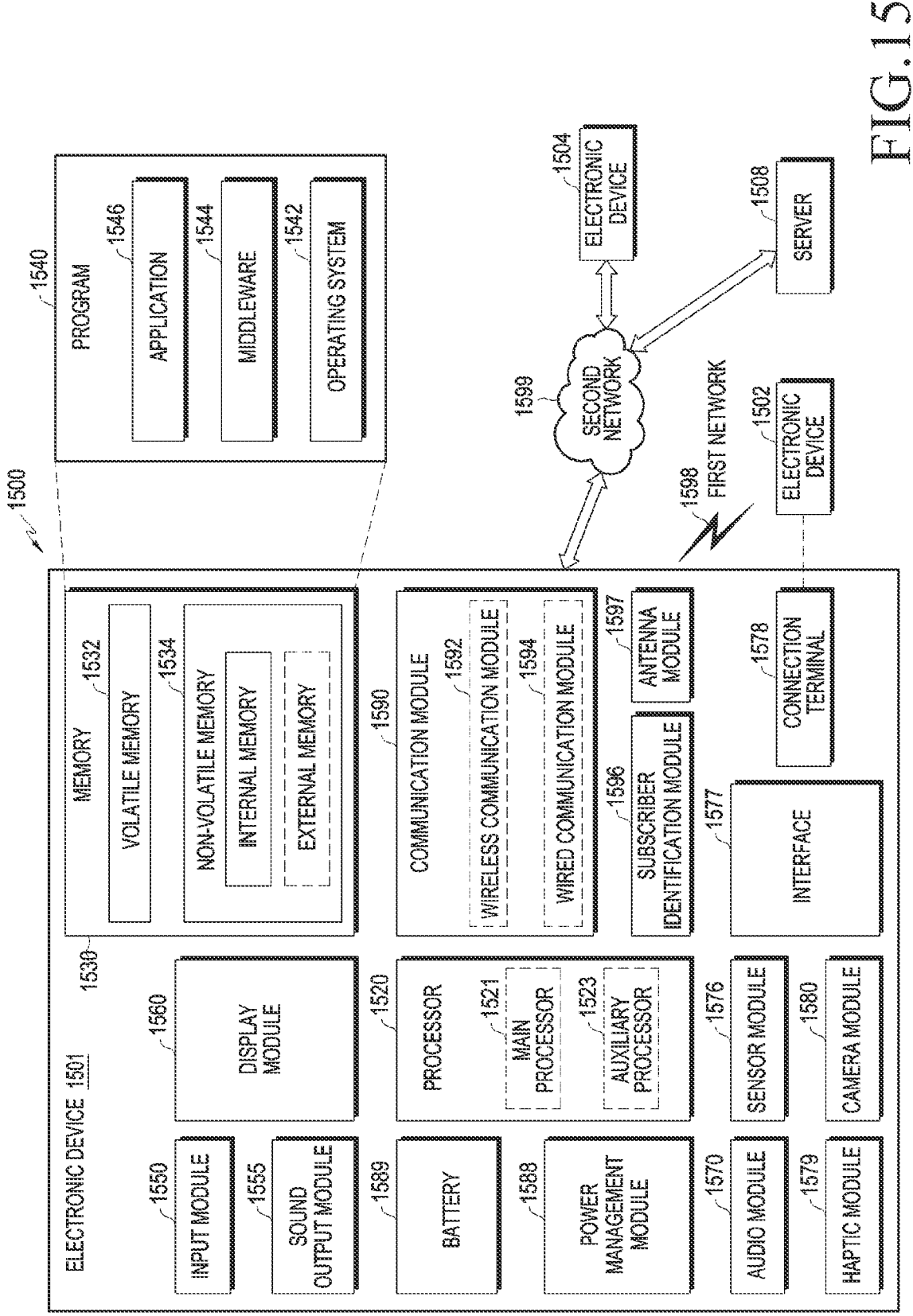
FIG. 15 illustrates a block diagram of an electronic device according to various embodiments in a network environment.

FIG. 15 is a block diagram 1500 illustrating an electronic device in a network environment according to various embodiments.

FIG. 15 is a block diagram illustrating an electronic device 1501 in a network environment 1500 according to various embodiments. Referring to FIG. 15, the electronic device 1501 in the network environment 1500 may communicate with an electronic device 1502 via a first network 1598 (e.g., a short-range wireless communication network), or an electronic device 1504 or a server 1508 via a second network 1599 (e.g., a long-range wireless communication network). According to an embodiment, the electronic device 1501 may communicate with the electronic device 1504 via the server 1508. According to an embodiment, the electronic device 1501 may include a processor 1520, memory 1530, an input device 1550, a sound output device 1555, a display device 1560, an audio module 1570, a sensor module 1576, an interface 1577, a haptic module 1579, a camera module 1580, a power management module 1588, a battery 1589, a communication module 1590, a subscriber identification module (SIM) 1596, or an antenna module 1597. In some embodiments, at least one (e.g., the display device 1560 or the camera module 1580) of the components may be omitted from the electronic device 1501, or one or more other components may be added in the electronic device 1501. In some embodiments, some of the components may be implemented as single integrated circuitry. For example, the sensor module 1576 (e.g., a fingerprint sensor, an iris sensor, or an illuminance sensor) may be implemented as embedded in the display device 1560 (e.g., a display).

The processor 1520 may execute, for example, software (e.g., a program 1540) to control at least one other component (e.g., a hardware or software component) of the electronic device 1501 coupled with the processor 1520, and may perform various data processing or computation. According to one embodiment, as at least part of the data processing or computation, the processor 1520 may load a command or data received from another component (e.g., the sensor module 1576 or the communication module 1590) in volatile memory 1532, process the command or the data stored in the volatile memory 1532, and store resulting data in non-volatile memory 1534. According to an embodiment, the processor 1520 may include a main processor 1521 (e.g., a central processing unit (CPU) or an application processor (AP)), and an auxiliary processor 1523 (e.g., a graphics processing unit (GPU), an image signal processor (ISP), a sensor hub processor, or a communication processor (CP)) that is operable independently from, or in conjunction with, the main processor 1521. Additionally or alternatively, the auxiliary processor 1523 may be adapted to consume less power than the main processor 1521, or to be specific to a specified function. The auxiliary processor 1523 may be implemented as separate from, or as part of the main processor 1521.

The auxiliary processor 1523 may control at least some of functions or states related to at least one component (e.g., the display device 1560, the sensor module 1576, or the communication module 1590) among the components of the electronic device 1501, instead of the main processor 1521 while the main processor 1521 is in an inactive (e.g., sleep) state, or together with the main processor 1521 while the main processor 1521 is in an active (e.g., executing an application) state. According to an embodiment, the auxiliary processor 1523 (e.g., an image signal processor or a communication processor) may be implemented as part of another component (e.g., the camera module 1580 or the communication module 1590) functionally related to the auxiliary processor 1523.

The memory 1530 may store various data used by at least one component (e.g., the processor 1520 or the sensor module 1576) of the electronic device 1501. The various data may include, for example, software (e.g., the program 1540) and input data or output data for a command related thereto. The memory 1530 may include the volatile memory 1532 or the non-volatile memory 1534.

The program 1540 may be stored in the memory 1530 as software, and may include, for example, an operating system (OS) 1542, middleware 1544, or an application 1546.

The input device 1550 may receive a command or data to be used by a component (e.g., the processor 1520) of the electronic device 1501, from the outside (e.g., a user) of the electronic device 1501. The input device 1550 may include, for example, a microphone, a mouse, a keyboard, or a digital pen (e.g., a stylus pen).

The sound output device 1555 may output sound signals to the outside of the electronic device 1501. The sound output device 1555 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 1560 may visually provide information to the outside (e.g., a user) of the electronic device 1501. The display device 1560 may include, for example, a display, a hologram device, or a projector and control circuitry to control a corresponding one of the display, hologram device, and projector. According to an embodiment, the display device 1560 may include touch circuitry adapted to detect a touch, or sensor circuitry (e.g., a pressure sensor) adapted to measure the intensity of force incurred by the touch.

The audio module 1570 may convert a sound into an electrical signal and vice versa. According to an embodiment, the audio module 1570 may obtain the sound via the input device 1550, or output the sound via the sound output device 1555 or an external electronic device (e.g., an electronic device 1502 (e.g., a speaker or a headphone)) directly or wirelessly coupled with the electronic device 1501.

The sensor module 1576 may detect an operational state (e.g., power or temperature) of the electronic device 1501 or an environmental state (e.g., a state of a user) external to the electronic device 1501, and then generate an electrical signal or data value corresponding to the detected state. According to an embodiment, the sensor module 1576 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1577 may support one or more specified protocols to be used for the electronic device 1501 to be coupled with the external electronic device (e.g., the electronic device 1502) directly or wirelessly. According to an embodiment, the interface 1577 may include, for example, a high definition multimedia interface (HDMI), a universal serial bus (USB) interface, a secure digital (SD) card interface, or an audio interface.

A connecting terminal 1578 may include a connector via which the electronic device 1501 may be physically connected with the external electronic device (e.g., the electronic device 1502). According to an embodiment, the connecting terminal 1578 may include, for example, a HDMI connector, a USB connector, a SD card connector, or an audio connector (e.g., a headphone connector).

The haptic module 1579 may convert an electrical signal into a mechanical stimulus (e.g., a vibration or a movement) or electrical stimulus which may be recognized by a user via his tactile sensation or kinesthetic sensation. According to an embodiment, the haptic module 1579 may include, for example, a motor, a piezoelectric element, or an electric stimulator.

The camera module 1580 may capture a still image or moving images. According to an embodiment, the camera module 1580 may include one or more lenses, image sensors, image signal processors, or flashes.

The power management module 1588 may manage power supplied to the electronic device 1501. According to one embodiment, the power management module 1588 may be implemented as at least part of, for example, a power management integrated circuit (PMIC).

The battery 1589 may supply power to at least one component of the electronic device 1501. According to an embodiment, the battery 1589 may include, for example, a primary cell which is not rechargeable, a secondary cell which is rechargeable, or a fuel cell.

The communication module 1590 may support establishing a direct (e.g., wired) communication channel or a wireless communication channel between the electronic device 1501 and the external electronic device (e.g., the electronic device 1502, the electronic device 1504, or the server 1508) and performing communication via the established communication channel. The communication module 1590 may include one or more communication processors that are operable independently from the processor 1520 (e.g., the application processor (AP)) and supports a direct (e.g., wired) communication or a wireless communication. According to an embodiment, the communication module 1590 may include a wireless communication module 1592 (e.g., a cellular communication module, a short-range wireless communication module, or a global navigation satellite system (GNSS) communication module) or a wired communication module 1594 (e.g., a local area network (LAN) communication module or a power line communication (PLC) module). A corresponding one of these communication modules may communicate with the external electronic device via the first network 1598 (e.g., a short-range communication network, such as Bluetooth™, wireless-fidelity (Wi-Fi) direct, or infrared data association (IrDA)) or the second network 1599 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1592 may identify and authenticate the electronic device 1501 in a communication network, such as the first network 15981 or the second network 1599, using subscriber information (e.g., international mobile subscriber identity (IMSI)) stored in the subscriber identification module 1596.

The antenna module 1597 may transmit or receive a signal or power to or from the outside (e.g., the external electronic device) of the electronic device 1501. According to an embodiment, the antenna module may include an antenna including a radiating element composed of a conductive material or a conductive pattern formed in or on a substrate (e.g., PCB). According to an embodiment, the antenna module 1597 may include a plurality of antennas. In such a case, at least one antenna appropriate for a communication scheme used in the communication network, such as the first network 1598 or the second network 1599, may be selected, for example, by the communication module 1590 from the plurality of antennas. The signal or the power may then be transmitted or received between the communication module 1590 and the external electronic device via the selected at least one antenna. According to an embodiment, another component (e.g., a radio frequency integrated circuit (RFIC)) other than the radiating element may be additionally formed as part of the antenna module 1597.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1501 and the external electronic device 1504 via the server 1508 coupled with the second network 1599. Each of the electronic devices 1502 and 1504 may be a device of a same type as, or a different type, from the electronic device 1501. According to an embodiment, all or some of operations to be executed at the electronic device 1501 may be executed at one or more of the external electronic devices 1502, 1504, or 1508. For example, if the electronic device 1501 should perform a function or a service automatically, or in response to a request from a user or another device, the electronic device 1501, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1501. The electronic device 1501 may provide the outcome, with or without further processing of the outcome, as at least part of a reply to the request. To that end, a cloud computing, distributed computing, or client-server computing technology may be used, for example.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
   a first housing structure including a first surface facing in a first direction, and a second surface facing in a second direction opposite to the first direction;
   a second housing structure including a third surface facing in a third direction, and a fourth surface facing in a fourth direction opposite to the third direction, the second housing structure being disposed to be rotatable relative to the first housing structure in a state of at least partially facing the first housing structure;
   a display disposed on the first surface of the first housing structure and the third surface of the second housing structure; and
   a control circuit,
   wherein:
      the first housing structure comprises a first wireless charger configured to perform a wireless charging function in relation to a first external electronic device,
      the second housing structure comprises a second wireless charger configured to perform a wireless charging function in relation to a second external electronic device,
      the second wireless charger is located to face the first wireless charger in a state in which the first housing structure and the second housing structure are folded to face each other,
      wherein the control circuit is configured to control the electronic device to perform the wireless charging function in relation to the second external electronic device under at least one predetermined condition, and
      the predetermined condition includes a state in which at least one of the second surface or the fourth surface faces the second external electronic device.

2. The electronic device of claim 1, wherein the control circuit is configured to control the electronic device to perform the wireless charging function in relation to the second external electronic device under at least one predetermined condition, and
   the predetermined condition includes a state in which the electronic device is supplied with power by the first external electronic device or an external power supply.

3. The electronic device of claim 1, wherein the control circuit is configured to control the electronic device to perform the wireless charging function in relation to the second external electronic device under at least one predetermined condition, and
   the predetermined condition includes a state in which, when one of the second surface or the fourth surface, through which radio wave interference is smaller than radio wave interference through the other, faces upwards.

4. The electronic device of claim 3, wherein the first wireless charger includes a wireless reception resonator configured to receive power from the first external electronic device, and
   the second wireless charger includes a wireless transmission resonator configured to supply power from the second external electronic device.

5. The electronic device of claim 4, wherein the control circuit is configured to:
   receive at least one of charging state information or peripheral surrounding information of the electronic device; and
   convert a reception function of at least one of the first wireless charger or the second wireless charger to a transmission function or the transmission function to the reception function based on at least one of the received charging state information or the peripheral surrounding information.

6. The electronic device of claim 1, wherein the electronic device is a foldable electronic device including a hinge structure connecting the first housing structure and the second housing structure to each other, or a detachable electronic device in which the first housing structure and the second housing structure include magnetic bodies, respectively, such that the first and second housing structures are detachably attached to each other using the magnetic bodies.

7. The electronic device of claim 1, wherein the electronic device is configured to:
   be charged by receiving wireless power using the first wireless charger or by being connected to an external power supply; and
   while charging the second external electronic device simultaneously using the second wireless charger.

8. The electronic device of claim 1, wherein, based on a charging state of the electronic device and a charging state of the second external electronic device, when remaining power in a battery of the second external electronic device is lower than remaining power in a battery of the electronic device, the control circuit is configured to perform charging for the second external electronic device at a charging rate higher than a charging rate for the electronic device.

9. The electronic device of claim 1, wherein during simultaneous charging of the first wireless charger and the second wireless charger, the control circuit is configured to perform a transmission or reception function of the first wireless charger according to a first frequency and perform a transmission or reception function of the second wireless charger according to a second frequency.

10. A method of simultaneously charging multiple electronic devices including an electronic device capable of performing a wireless power reception function and a wireless power transmission function with respect to an external electronic device and a control circuit configured to control the electronic device, wherein the electronic device includes a first housing structure including a first surface facing in a first direction, and a second surface facing in a second direction opposite to the first direction; a second housing structure including a third surface facing in a third direction, and a fourth surface facing in a fourth direction opposite to the third direction, the second housing structure being disposed to be rotatable relative to the first housing structure in a state of at least partially facing the first housing structure; a display disposed on the first surface of the first housing structure and the third surface of the second housing structure, the method comprising:
- identifying whether the electronic device is in a charging state;
- identifying whether the electronic device is in a folded state;
- identifying whether the external electronic device is close to the electronic device by a predetermined distance; and
- charging the external electronic device using the wireless power transmission function based on a predetermined condition being satisfied.

11. The method of claim 10, further comprising:
- identifying, by the electronic device, whether a surface having small radio wave interference faces upwards based on one of a second surface or a fourth surface, through which radio wave interference being smaller than radio wave interference through the other.

12. The method of claim 10, wherein the electronic device is a foldable electronic device including a hinge structure connecting a first housing structure and a second housing structure to each other, or a detachable electronic device in which the first housing structure and the second housing structure include magnetic bodies, respectively, such that the first and the second housing structures are detachably attached to each other using the magnetic bodies.

13. The method of claim 10, wherein the control circuit is configured to:
- receive at least one of charging state information or surrounding environment information of the electronic device; and
- convert a reception function of the electronic device to a transmission function or the transmission function of the electronic device to the reception function.

14. The method of claim 10, wherein, based on a charging state of the electronic device and a charging state of the external electronic device, based on a remaining power in a battery of the external electronic device being lower than a remaining power in a battery of the electronic device, the control circuit is configured to perform charging for the external electronic device to be performed at a charging rate higher than a charging rate for the electronic device.

* * * * *